US011622653B2

(12) United States Patent
Simms, II

(10) Patent No.: US 11,622,653 B2
(45) Date of Patent: Apr. 11, 2023

(54) BARBECUE GRILL WITH OPTIMIZED INTERFACE TO ATTACHMENTS

(71) Applicant: John Lee Simms, II, Atlanta, GA (US)

(72) Inventor: John Lee Simms, II, Atlanta, GA (US)

(73) Assignee: A&J Manufacturing, LLC, Atlanta, GA (US)

(*) Notice: Subject to any disclaimer, the term of this patent is extended or adjusted under 35 U.S.C. 154(b) by 0 days.

(21) Appl. No.: 15/399,665

(22) Filed: Jan. 5, 2017

(65) Prior Publication Data
US 2017/0112323 A1 Apr. 27, 2017

Related U.S. Application Data

(63) Continuation of application No. 13/769,147, filed on Feb. 15, 2013, now Pat. No. 9,572,456.

(60) Provisional application No. 61/599,088, filed on Feb. 15, 2012.

(51) Int. Cl.
A47J 37/07 (2006.01)
B23P 19/04 (2006.01)

(52) U.S. Cl.
CPC ....... A47J 37/0786 (2013.01); A47J 37/0763 (2013.01); B23P 19/04 (2013.01); Y10T 29/49948 (2015.01)

(58) Field of Classification Search
CPC .............................. A47J 47/06; A47J 47/0704
USPC ..... 126/9 R, 25 A, 25 R, 25 B, 283; 99/340, 99/443 R
See application file for complete search history.

(56) References Cited

U.S. PATENT DOCUMENTS

| | | | |
|---|---|---|---|
| 3,049,071 A | 8/1962 | Diak | |
| 3,121,386 A | 2/1964 | Persinger et al. | |
| 3,327,609 A * | 6/1967 | Sage | F24C 15/002 |
| | | | 126/85 B |
| 3,396,715 A * | 8/1968 | Allen | A47J 37/0709 |
| | | | 126/25 B |
| 3,933,144 A | 1/1976 | Bandy | |

(Continued)

OTHER PUBLICATIONS

Non-Final Office Action for U.S. Appl. No. 13/769,147, dated Nov. 26, 2014, John Lee Simms II, "Barbeque Grill with Optimized Interface to Attachments" 8 pages.

(Continued)

Primary Examiner — Avinash A Savani
(74) Attorney, Agent, or Firm — John J. Bamert, Esq.; Bamert Regan PLLC

(57) ABSTRACT

Disclosed are assemblies, methods, and means for installing attachments in barbecue grills. A barbecue grill may include, in a cooking body of the barbecue grill, an opening and a plurality of holes configured to facilitate installation of an attachment for the barbecue grill. In some embodiments, an attachment comprises a smoke box and is configured to be installed in the opening and securely fastened to the barbecue grill by using fasteners receivably positioned in the plurality of holes. In some embodiments, an attachment comprises a cover plate and is configured to be installed in the opening and securely fastened to the barbecue grill by using fasteners receivably positioned in the plurality of holes. In some embodiments, the barbecue grill comprises a plurality of means for interfacing with attachments, and a means for substantially covering the opening including a plurality of means for interfacing with the cooking body.

20 Claims, 17 Drawing Sheets

(56) References Cited

U.S. PATENT DOCUMENTS

| | | | |
|---|---|---|---|
| 4,455,991 A | | 6/1984 | Su |
| 4,665,891 A | | 5/1987 | Nemec |
| 5,195,423 A | | 3/1993 | Beller |
| 5,765,543 A | | 6/1998 | Hopkins |
| 6,045,140 A | * | 4/2000 | Morris, Jr. ............... F16J 15/06 277/630 |
| 6,209,533 B1 | * | 4/2001 | Ganard ............... A47J 37/0704 126/25 R |
| 7,644,711 B2 | * | 1/2010 | Creel ...................... F24B 1/192 126/21 R |
| 7,984,709 B1 | * | 7/2011 | Byrnes ................ A47J 37/0704 126/25 R |
| 8,381,712 B1 | * | 2/2013 | Simms, II ........... A47J 37/0704 126/25 R |
| 8,485,176 B2 | | 7/2013 | McLemore et al. |
| 9,572,456 B2 | | 2/2017 | Sins |
| 2006/0260599 A1 | | 11/2006 | Butt |
| 2010/0206287 A1 | * | 8/2010 | McLemore ......... A47J 37/0731 126/1 R |

OTHER PUBLICATIONS

Final Office Action for U.S. Appl. No. 13/769,147, dated Mar. 11, 2015, John Lee Simms II, "Barbeque Grill with Optimized Interface to Attachments" 9 pages.
Non-Final Office Action for U.S. Appl. No. 13/769,147, dated Feb. 25, 2016, John Lee Simms II, "Barbeque Grill with Optimized Interface to Attachments" 7 pages.
Final Office Action for U.S. Appl. No. 13/769,147, dated Jul. 25, 2016, John Lee Simms II, "Barbeque Grill with Optimized Interface to Attachments" 7 pages.
Advisory Action for U.S. Appl. No. 13/769,147, dated Sep. 8, 2016, John Lee Simms II, "Barbeque Grill with Optimized Interface to Attachments" 3 pages.
Notice of Allowance for U.S. Appl. No. 13/769,147, dated Oct. 6, 2016, John Lee Simms II, "Barbeque Grill with Optimized Interface to Attachments" 5 pages.
Case 2:17-cv-00022-LGW-RSB, Document 21, Filed Jul. 7, 2017—*A&J Manufacturing, LLC v. Char-Broil, LLC and Zhejiang Fudeer Electric Applicance Co., Ltd.*, Answer and Counterclaim of Defendant Char-Broil, LLC, 95 pages.
CharGriller Professional Grills & Smokers, Owner's Manual, 2005, 4 pages.
CharGriller Professional Grills & Smokers, Owner's Manual, 2005, 8 pages.
CharGriller Professional Grills & Smokers, Owner's Manual, 2004, 8 pages.
Masterbuilt, Assembly, Care & Use Manual Warning & Safety Information Models 10040510, 10040610 Classic Barrel Grill, 2010, 20 pages.
Masterbuilt, Assembly, Care & Use Manual Warning & Safety Information Model 10100110—Side Fire Box Accessory, 2010, 8 pages.
CharGriller Professional Grills & Smokers, Owner's Manual, Charcoal Grill, Model# 2-2424 Side Fire Box, 2010, 16 pages.
Char-Broil, Keepers of the Flame, Offset Smoker Firebox/Tabletop Grill, Product Guide Model 11201715, Dec. 15, 2010, 16 pages.
Char-Broil, Keepers of the Flame, American Gourmet 800 Series, Product Guide Model 11301714, Dec. 7, 2010, 16 pages.
Kingsford, Bronco Barrell Grill Model# GR1031-014984, Owner'S Manual Assembly and Operating Instructions, 2010, 17 pages.
Kingsford, 30" Charcoal Grill, Product Guide Model 11301648, 2008, 20 pages.
Kingsford. Sierra Smoker Model# GR4030-014989SQFB, Owner's Manual Assembly and Operating Instructions, 2010, 20 pages.
Brinkmann 810-3825-S Firebox Manual, 2010, 42 pages.
Masterbuilt 10100106 Side Fire Box Manual, 6 pages.
Masterbuilt 10040806 Charcoal Barrel Grill Manual, 10 pages.
Notice Regarding Options for Amendments by Patent Owner Through Reissue or Reexamination During a Pending AIA Trial Proceeding Published Apr. 2019.
A&J Mfg., Char-Griller Owner's Manual, Model# 2-2424 Side Fire Box, pp. 1-16, pub. Jan. 16, 2011.
A&J Mfg., Char-Griller Owner's Manual, Duo Model #5050 LP Gas & Charcoal Grill, © 2006 (Ex. 1010, pp. 36-64, "the Duo Manual").
Masterbuilt Mfg., Inc., Kingsford Assembly, Care & Use Manual, Model 10100106—Side Fire Box Accessory, pp. 1-10, pub. 2009.
Masterbuilt Mfg., Inc., Kingsford Assembly, Care & Use Manual, Model 10040806 Charcoal Grill, pp. 1-18, pub. 2009 (Ex. 1007, "the Masterbuilt Grill Manual".
*SAS Inst. Inc.* v. *Iancu*, 138 S. Ct. 1348, 1359 (2018).
37 C.F.R. § 42.100(b) (2017) See Changes to the Claim Construction Standard for Interpreting Claims in Trial Proceedings Before the Patent Trial and Appeal Board, 83 Fed. Reg. 51,340 (Oct. 11, 2018) (amending 37 C.F.R. § 42.100(b), effective Nov. 13, 2018).
37 C.F.R. § 42.8(a)(3), (b)(2), Nov. 13, 2019.

* cited by examiner

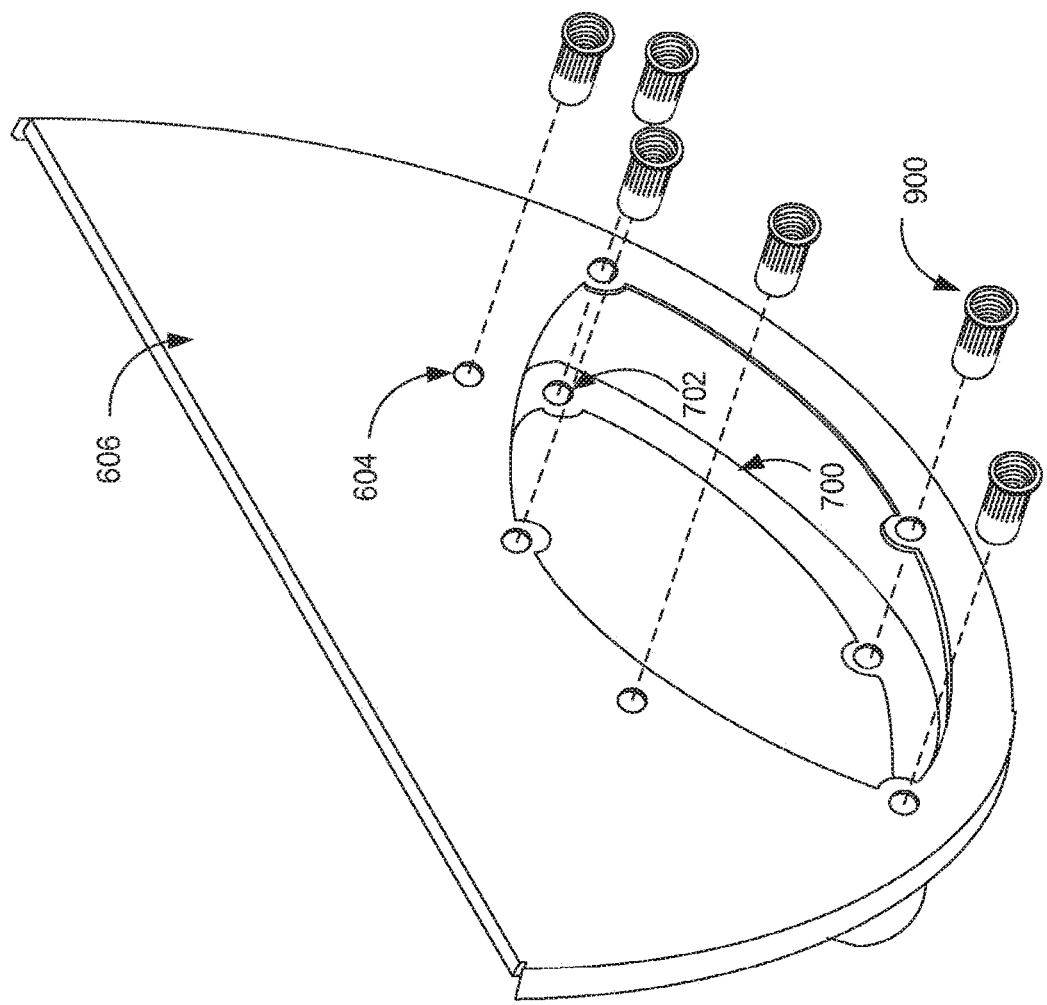
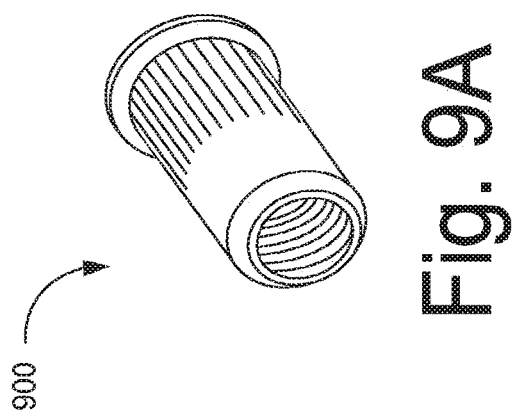

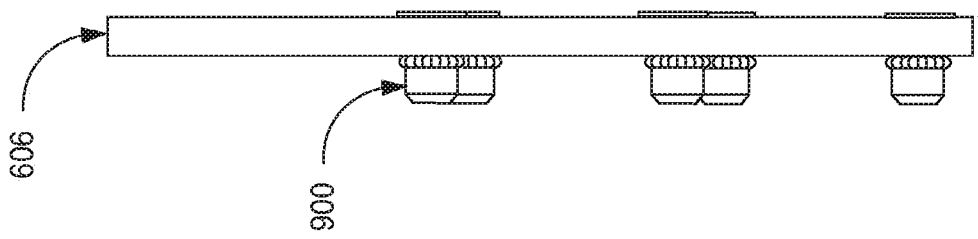
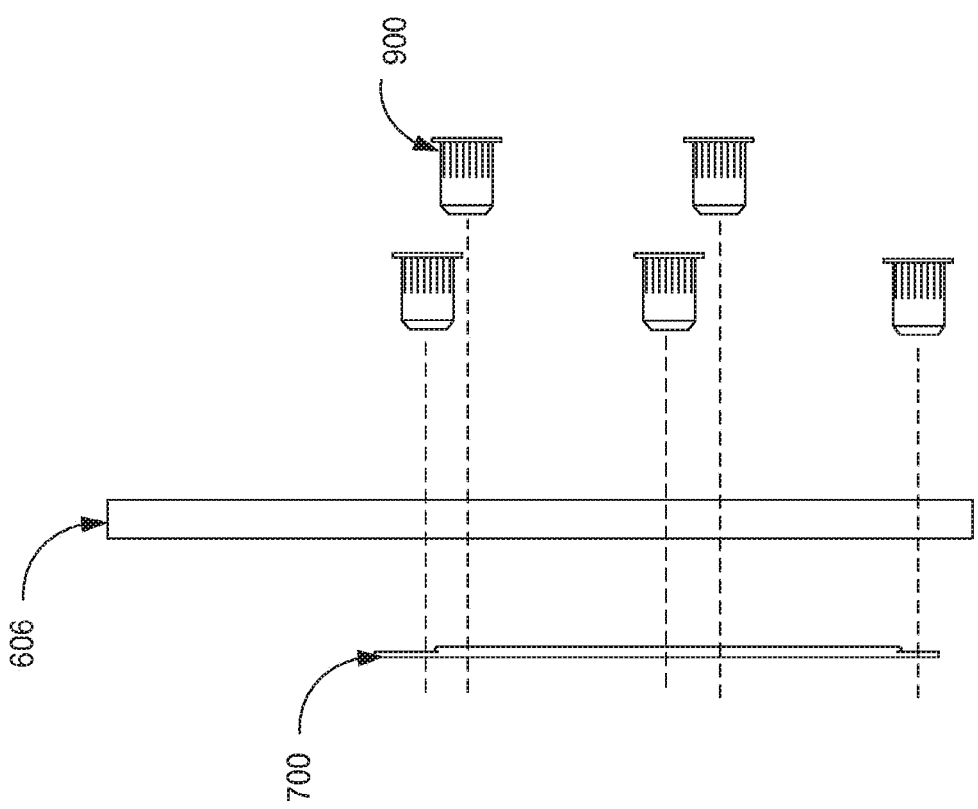
Fig. 9D
Fig. 9C

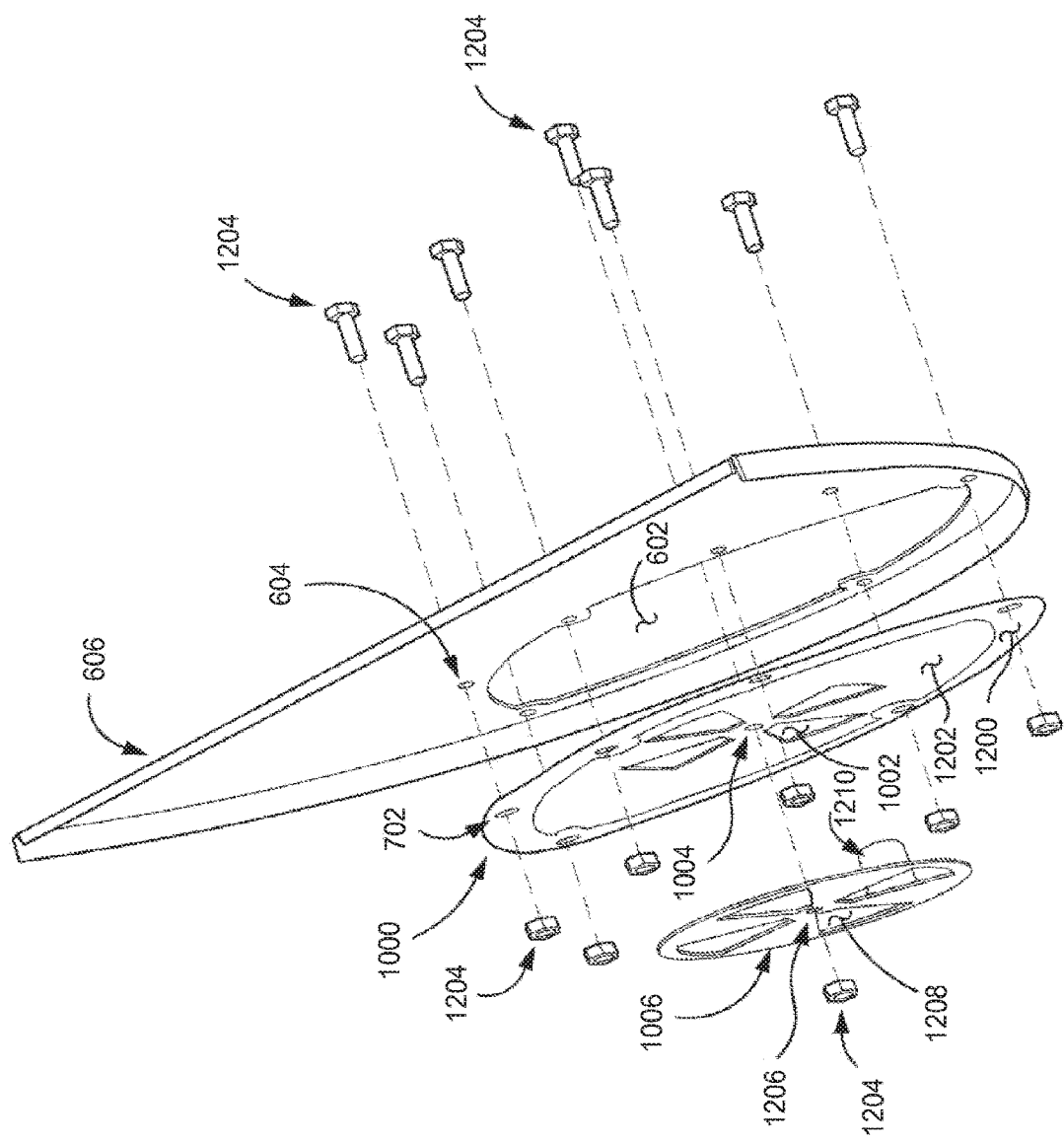

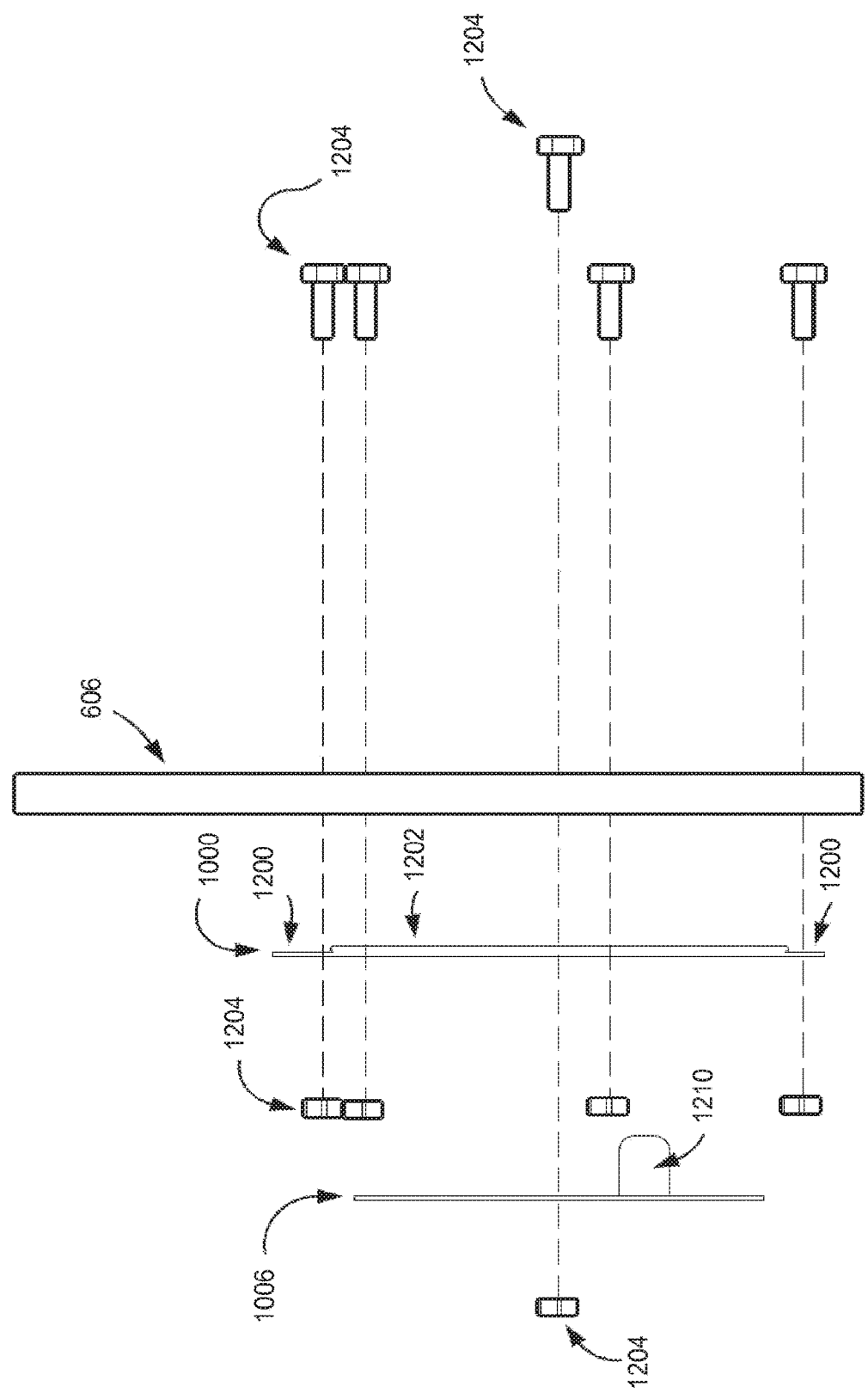

BARBECUE GRILL WITH OPTIMIZED INTERFACE TO ATTACHMENTS

CROSS REFERENCES TO RELATED APPLICATIONS

This application is a continuation of U.S. Non-Provisional application Ser. No. 13/769,147, entitled "Barbeque Grill With Optimized Interface to Attachments," filed on Feb. 15, 2013, which claims priority to U.S. Provisional Application No. 61/599,088, filed on Feb. 15, 2012, entitled "Barbecue Grill With Optimized Interface to Barbecue Attachments," both of which are hereby incorporated by reference in their entirety for all purposes.

FIELD OF THE INVENTION

The present invention relates generally to barbecue grills, and in particular, to a means for interfacing with attachments in barbecue grills.

DESCRIPTION OF THE RELATED ART

Barbecue grills are a staple item in many households. Barbecue enthusiasts use barbecue grills to prepare different types of food using various modes and techniques. The end result is food that can please almost all appetites, taste palates, and needs.

Over the years, the various modes and techniques for preparing different types of food have evolved to include adding attachments to barbecue grills. Attachments can be used to enhance or alter the food preparation and cooking process on the barbecue grill. For example, a barbecue enthusiast can attach a smoke box to a barbecue grill in order to infuse a smoking flavor in the food prepared on the barbecue grill. In this scenario, the barbecue enthusiast is able to replicate one of the functions of a food smoker by attaching the smoke box to the barbecue grill.

However, existing barbecue grills do not offer interfaces that allow an easy and secure installation of attachments. For example, in order to create a large opening for an attachment to a barbecue grill, manufacturers design barbecue grills with a plurality of perforations located in a body of the barbecue grill such that a user can remove an area of the barbecue grill bounded by the perforations to create an opening. The user can then install an attachment in the created opening using a snap-on or other type of installation. The created opening and the snap-on installation of the attachment therein suffer from multiple drawbacks, as described in the prior art with reference to FIGS. 1-5 below.

FIGS. 1-3 depict a front view, an isometric view, and a side view, respectively, of an exemplary prior art barbecue grill. A barbecue grill 100 may include a cooking body 102, such as a barbecue grill body. The cooking body 102 may be made out of a material, such as metal, ceramic, brick or stone, that can withstand high temperatures. The cooking body 102 may have various shapes, such as circular kettle, as shown in FIG. 1, a cylindrical barrel, an oval egg, a rectangular/block shape, or other shapes. In some shapes, such as a cylindrical barrel, the cooking body 102 may have various side walls. The barbecue grill 100 may also have a lid (not shown) that attaches to some component of the barbecue grill 100 such as the cooking body 102. For example, one or more hinges may be used to attach the lid to the cooking body 102.

The barbecue grill 100 may further include a support structure 104 to support the cooking body 102. The support structure 104 may be configured to enable movement/transport of the barbecue grill 100 as depicted in FIGS. 1 and 2 via wheels 106, or similar mechanism, such as continuous tracks or treads. In some embodiments, the support structure 104 may be affixed to the cooking body 102 by means of welding or fasteners. The support structure 104 may have various legs that both support and control the mobility of the barbecue grill 100. Some or all of the legs may include the wheels 106 to allow the barbecue grill 100 to be easily moved from one location to another. Other legs could also provide a breaking or friction mechanism that resists any movement of the barbecue grill 100 from a certain location. The wheels 106 may be part of respective casters that rotate, allowing for even greater mobility.

The barbecue grill 100 may also include other features such as a shelf 108, which may serve a dual function as a handle. The shelf 108, when used as a handle, can be used to carry and move the barbecue grill 100 from one location to another. The shelf 108 may be welded to the cooking body 102 or can be installed using fasteners, such as nuts and bolts, rivets, sheet metal screws, and the like. The shelf 108 may be made of various materials, such as metal, plastic, wood, and the like, or any combination thereof. The shelf 108 may further be used to prepare food or set utensils or other items upon while they are not in use.

FIGS. 1-3 also depict a barbecue grill 100 having a plurality of perforations 110 that define a perforated area 112. The barbecue grill 100 may be manufactured with the plurality of perforations 110 defining the perforated area 112 on the cooking body 102. The plurality of perforations 110 may be a plurality of holes in the cooking body 102. A size and location of the perforations 110 are chosen such that the structural integrity of the cooking body 102 is not significantly compromised. As an example, a perforation 110 may be a circular hole going through the cooking body 102 from an outside to an inside surface of the cooking body 102. The perforated area 112 is an area of the cooking body 102 bounded by the plurality of perforations 110.

Turning now to FIG. 3, the cooking body 102 may be configured to hold a cooking surface 300 such as a cooking grid. The cooking surface 300 may be a grill, a griddle, a full or partial cooking plate, or other type of cooking plate. The cooking surface 300 may be made of stainless-steel, porcelain- coated cast iron, or any other suitable material for cooking food thereon. Food, such as hamburgers, hot dogs, or vegetables can be placed on the cooking surface 300 for cooking. The cooking body 102 may also be configured to use a fuel source, such as charcoal, wood, gas, or electric heating elements to heat the cooking surface 300. For example, in a gas barbecue grill, a gas burner can be installed within the cooking body 102 to provide a direct flame from the fuel source to the cooking surface 300.

FIGS. 4 and 5 illustrate an example installation of an attachment to an exemplary prior art barbecue grill 400. The barbecue grill 400 may comprise some or all components of the barbecue grill 100 described in FIGS. 1-3. The perforated area 112 may permit a user to install an attachment in the cooking body 102 after manufacturing the barbecue grill 400. The perforated area 112 may be removed by a user, such as by hammering or knocking out the perforated area 112, to create an opening 402 in the cooking body 102. The opening 402 may permit an attachment 404 to be attached to the cooking body 102. The attachment 404 may provide additional functionality not previously available in the as-manufactured barbecue grill 400. For example, the attachment 404 may be a smoke box used to introduce smoke into the cooking body 102. In such a case, the smoke box attachment enables the barbecue grill 400 to also function as a food smoker.

However, the process of creating the opening 402, by removing the perforated area 112, frequently lacks precision and typically results in sub-optimal openings. To create the opening 402, tools, such as a hammer, are used to knock out and remove the perforated area 112 from the cooking body 102. This process may introduce unneeded dents in the cooking body 102 or elsewhere, especially proximate the opening 402. When the perforated area 112 has been removed, the edges of the opening 402 in the cooking body 102 may be damaged, or the perforations 110 may not break well enough to leave a clean edge, possibly subjecting a user to dangerously sharp edges. In one example scenario, if the attachment 404 has a snap-on mechanism that interfaces with the edges of the opening 402 in the cooking body 102, and the edges are damaged in some way, the snap-on mechanism may not properly interface with the damaged edges. Further, even if the snap-on mechanism holds to the damaged edges, the damaged edges may prevent the attachment 404 from being located in the intended position. In addition, because the process of removing the perforated area 112 depends in most cases on the precision of the user creating the opening 402, the resulting size and shape of the opening 402 may not sufficiently match the interface of the attachment 404. Thus, the attachment 404 cannot be securely attached to the cooking body 102.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed in embodiments herein are assemblies, methods, and means for interfacing with attachments in barbecue grills. In some embodiments, a barbecue grill is manufactured with an opening and with a plurality of fastener holes in a cooking body of the barbecue grill. An attachment with a plurality of fastener holes, such as a smoke box, an air vent plate, or a cover plate, may be coupled to the barbecue grill in a location of the manufactured opening. The attachment may be attached to the cooking body using a plurality of fasteners through some or all of the manufactured fastener holes located in the cooking body of the barbecue grill and in the attachment.

In some embodiments, a barbecue grill includes a cooking body with a means for holding a cooking surface, an opening located below the means for holding the cooking surface, and a plurality of means for interfacing with attachments. The barbecue grill further includes a means for substantially covering the opening, the means for substantially covering the opening including a plurality of means for interfacing with the cooking body.

In some embodiments, an attachment, such as a plate, may be securely installed in a barbecue grill using a bolted-on technique. In addition, no post manufacturing alterations to the cooking body of the barbecue grill or opening thereof are needed, which avoids the risk of damage to the barbecue grill.

Other features and advantages of the present invention will become apparent from the following description of the invention, which refers to the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 9A illustrates an isometric view of a threaded rivet fastener according to embodiments disclosed herein;

FIG. 9B illustrates an isometric view of an exemplary installation of an attachment in a barbecue grill using multiple of the threaded rivet fasteners of FIG. 9A according to embodiments disclosed herein;

FIG. 9C illustrates a side view of an exemplary installation of an attachment in a barbecue grill using multiple of the threaded rivet fasteners of FIG. 9A according to embodiments disclosed herein;

FIG. 9D illustrates a side view of an exemplary installation of an attachment in a barbecue grill using multiple of the threaded rivet fasteners of FIG. 9A with the threaded rivet fasteners installed according to embodiments disclosed herein;

FIG. 12B illustrates an alternate isometric and multi-layered view of an exemplary installation of an attachment in a barbecue grill of FIG. 12A according to embodiments disclosed herein;

FIG. 12C illustrates a side vide of an exemplary installation of an attachment in a barbecue grill of FIG. 12A according to embodiments disclosed herein.

DETAILED DESCRIPTION

Certain specific details are set forth in the following description and figures to provide a thorough understanding of various embodiments of the disclosure. Certain well-known details often associated with barbecue grills are not set forth in the following disclosure to avoid unnecessarily obscuring the various embodiments of the disclosure. Further, a person having ordinary skill in the art will understand that they can practice other embodiments of the disclosure without one or more of the details described below.

Figure 1:
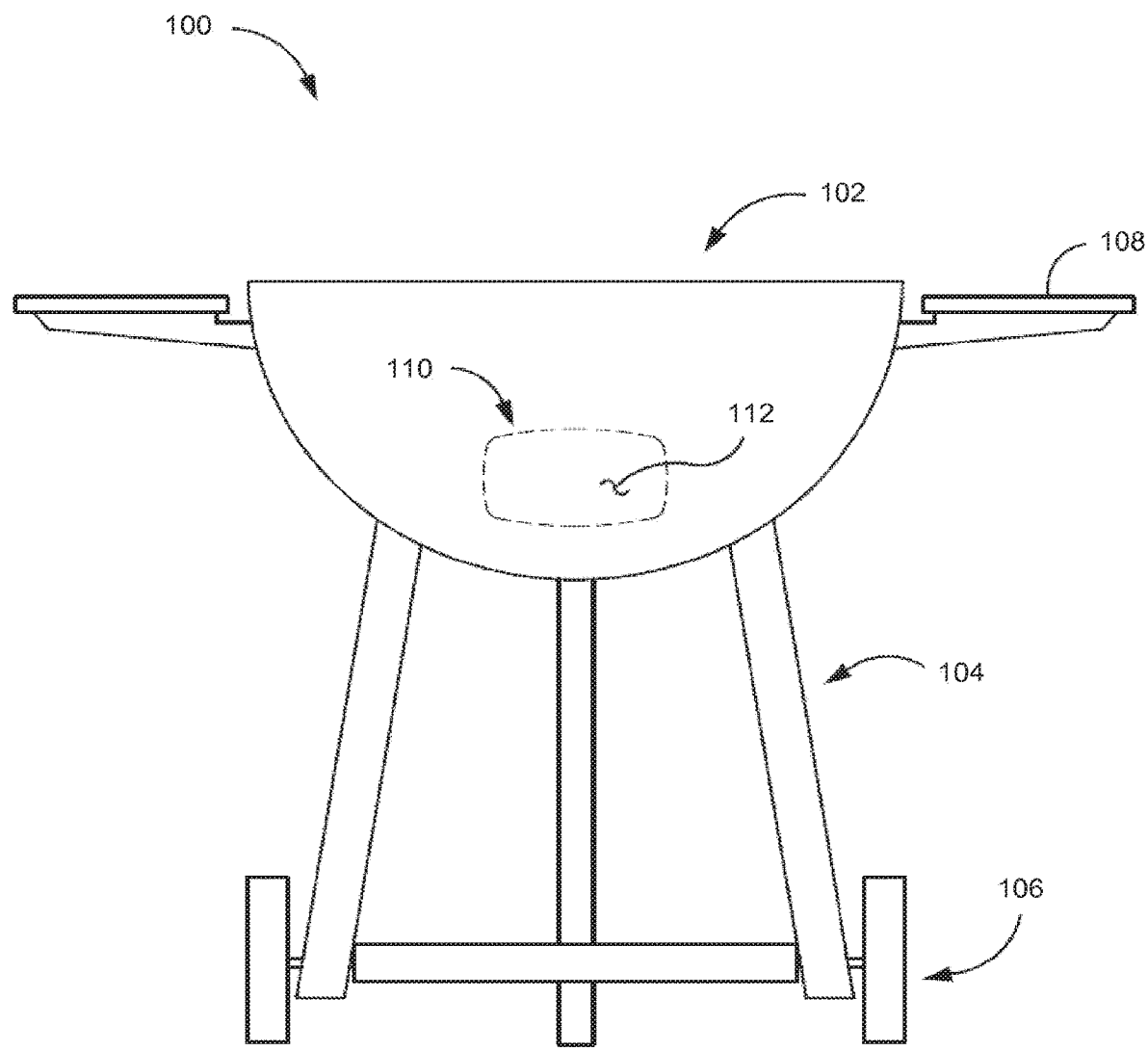
FIG. 1 illustrates a front view of a prior art barbecue grill.
Figure 2:
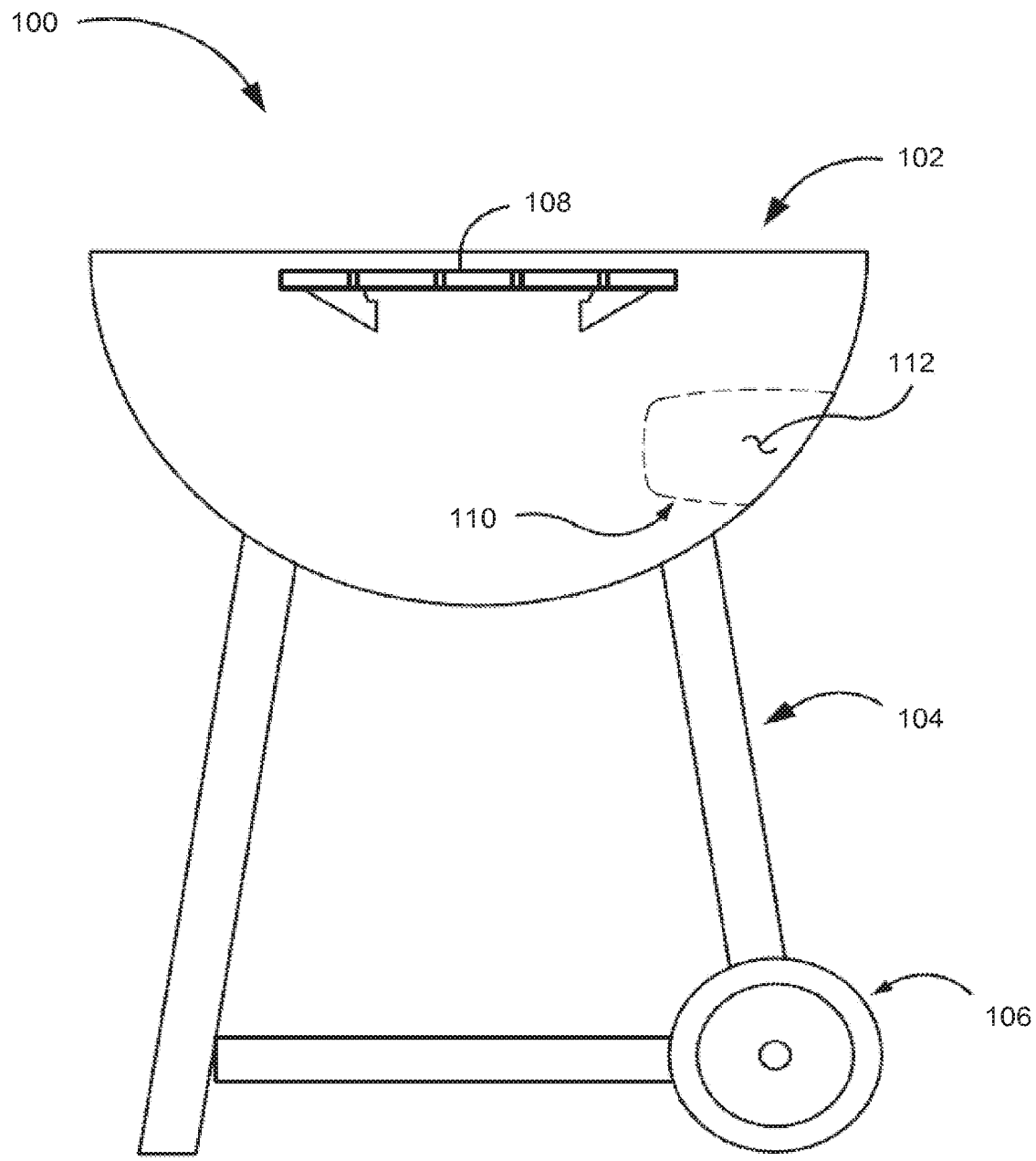
FIG. 2 illustrates a side view of a prior art barbecue grill.
Figure 3:
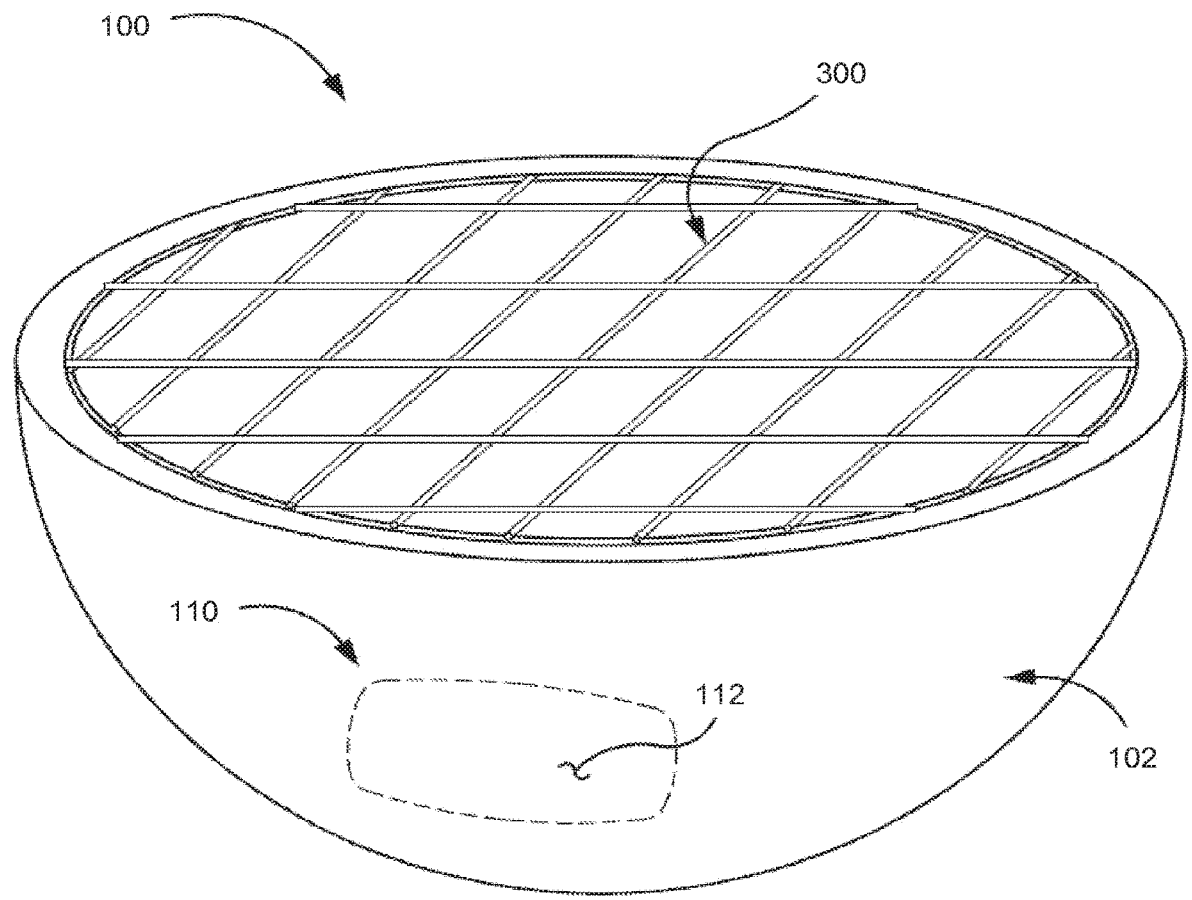
FIG. 3 illustrates an isometric view of a prior art cooking body of a barbecue grill.
Figure 4:
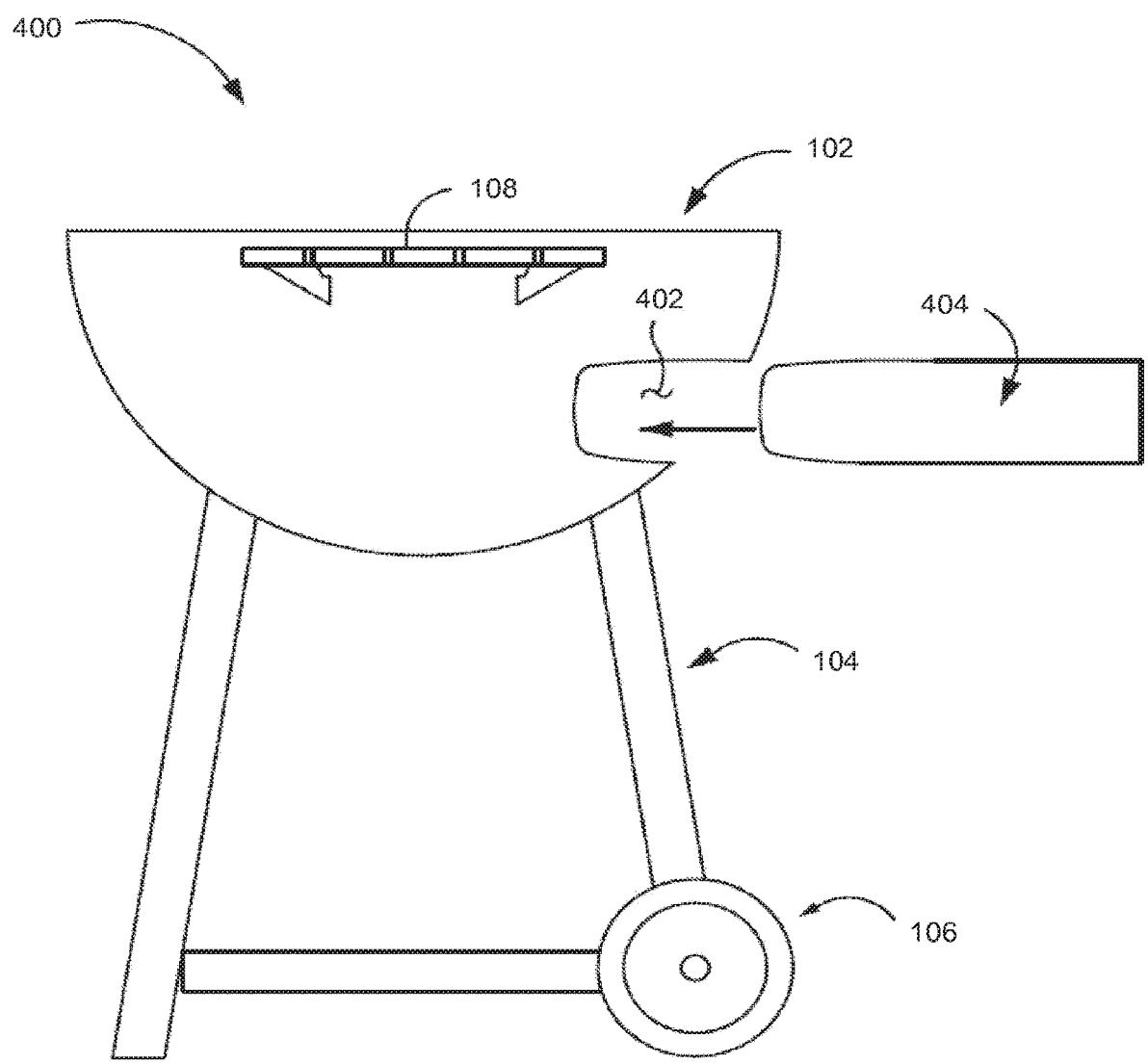
FIG. 4 illustrates installation of an example attachment to a prior art barbecue grill with a perforated area removed.
Figure 5:
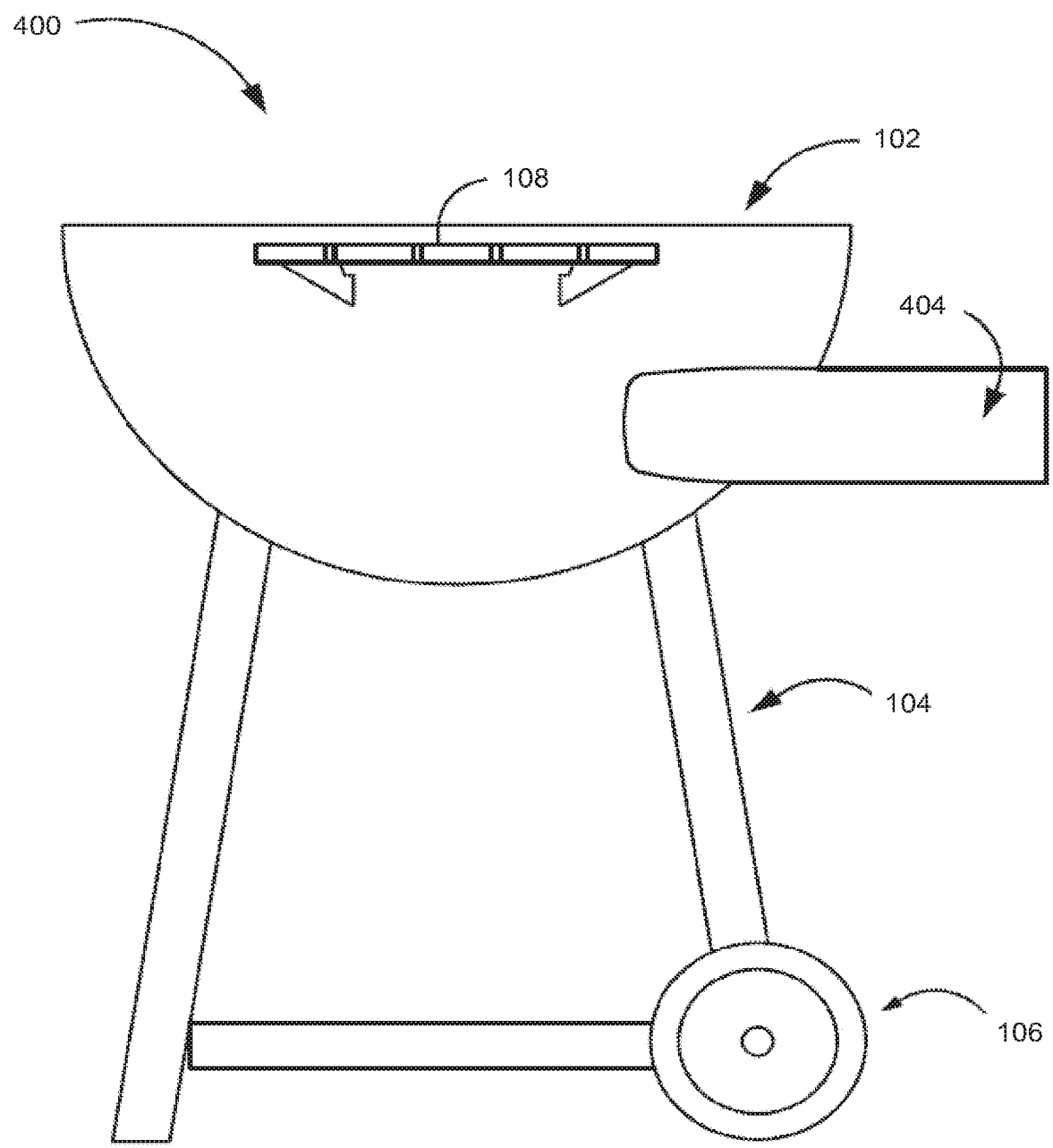
FIG. 5 illustrates the attachment installed in a prior art barbecue grill of FIG. 4.
Figure 6:
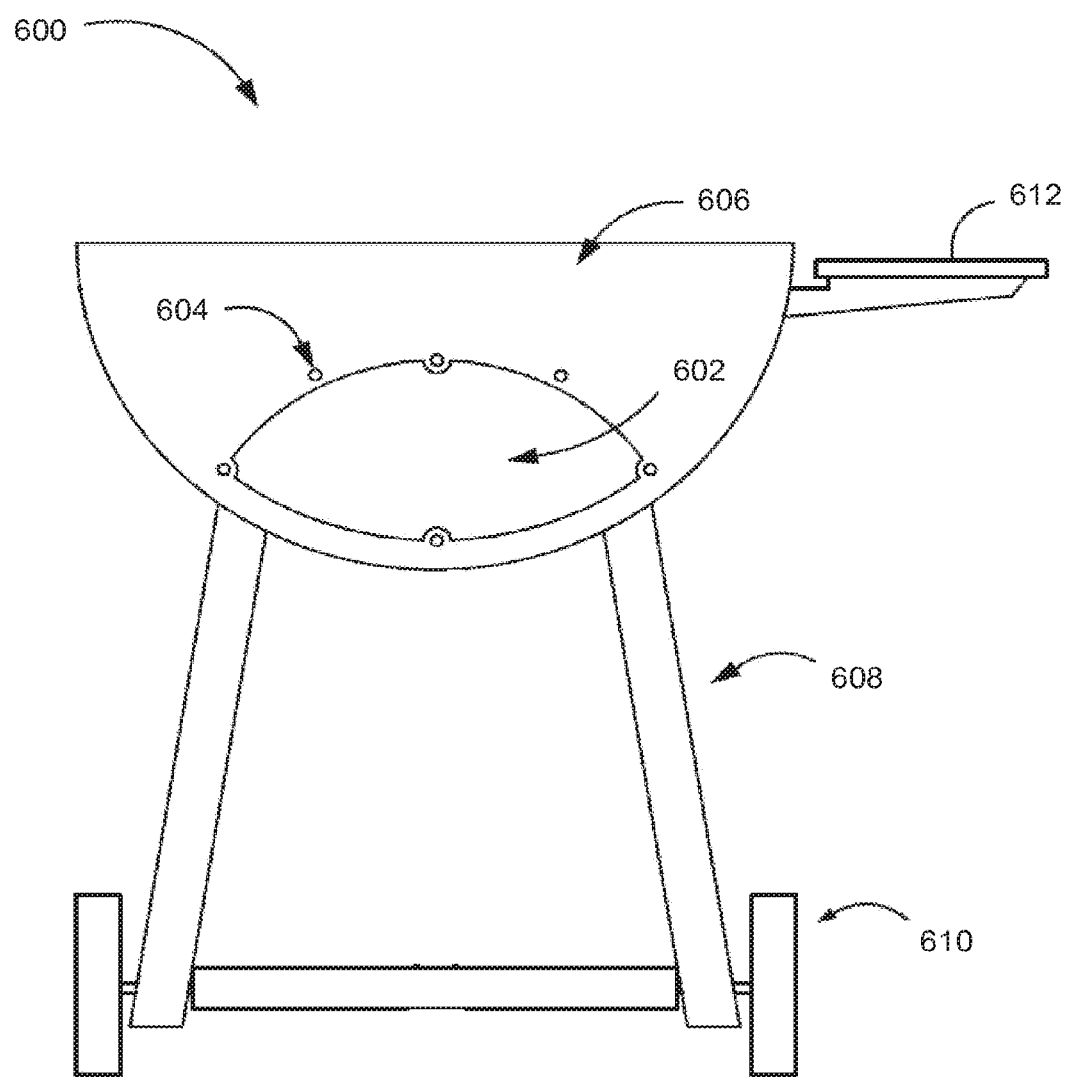
FIG. 6 illustrates a front view of an exemplary barbecue grill according to embodiments disclosed herein.

In some embodiments, a barbecue grill may include an opening and a plurality of holes that optimize an interface between the barbecue grill and an attachment. FIG. 6 illustrates a front view of an exemplary barbecue grill 600 (sometimes referred to herein as a "barbecue grill assembly" 600) including an opening 602 and a plurality of holes 604. The barbecue grill 600 may also include a cooking body 606, such as a barbecue grill body, configured to hold a cooking surface, such as a grill. For example, the cooking body 606 may comprise tabs, ridges, slots, platforms, ribs, steps, grooves, notches, and the like, which may be continuous or discontinuous around a periphery of an inside surface of the cooking body 606, to hold the cooking surface. The cooking body 606 may have various shapes, such as a cylindrical barrel as shown in FIG. 6, an oval egg, a rectangular/block shape, circular kettle, or other shapes. In some shapes, such as a cylindrical barrel of FIG. 6, the cooking body 606 may have various side walls. The barbecue grill 600 may also have a lid (not shown) that attaches to some component of the barbecue grill 600 such as the cooking body 606. The barbecue grill 600 may comprise some or all components of FIGS. 1-5.

In some embodiments, the opening 602 is created in the cooking body 606 of the barbecue grill 600 and may be located below the cooking surface of the barbecue grill 600. The edges of the opening 602 in the cooking body 606 may have a smooth surface. In addition, the opening 602 may conform to a certain shape and a certain size. Smooth edges, the shape and the size of the opening 602 can improve the interface to an attachment.

Furthermore, a plurality of holes 604 may be included in the cooking body 606. The plurality of holes 604 may comprise a plurality of fastener holes. In addition, the plurality of holes 604 may be located in proximity of the opening 602. For example, the plurality of holes 604 may be located within about 14 inch to within about five inches of a contour of the opening 602. Preferably, the plurality of holes 604 are located within about one inch of the contour of the opening 602. An attachment may be securely attached or otherwise coupled to the cooking body 606 using fasteners, such as nuts and bolts, rivets, butterfly fasteners, lugs, nails, pins, screws, key fasteners, locks, or the like, configured to be received through a number of the plurality of holes 604 and another plurality of holes in the attachment.

The opening 602 and the plurality of holes 604 may be created during or after manufacturing the barbecue grill 600. In some embodiments, a barbecue grill manufacturer may design and manufacture the barbecue grill 600 with the opening 602 and the plurality of holes 604. The manufacturer may design the location, size, shape, and edges of the opening 602 and the plurality of holes 604 to meet certain specifications. The certain specifications can allow the barbecue grill 600 to interface to a range of attachments. The opening 602 may comprise various shapes, such as circular, rectangular, elliptical or oval, or triangular, to name only a few shapes, and may have a symmetrical or irregular contour. Alternatively, the opening 602 and/or the plurality of holes 604 may be created post manufacturing of the barbecue grill 600 to meet the certain specifications.

As an example, the location of the opening 602 may be a location on the cooking body 606 below and away from a cooking surface, and close to a support structure 608 of the barbecue grill 600. The size of the opening 602 may be a percentage of a surface of the cooking body 606. The shape of the opening 602 may be substantially elliptical, as shown in FIG. 6. The plurality of holes 604 may be symmetrically spaced around and located within, for example, one inch of the contour of the opening 602. The plurality of holes 604 may include circular holes with diameters configured for use with particular fasteners between an outside and an inside surface of the cooking body 606. However, the plurality of holes 604 may be of any suitable shape to receive a corresponding fastener, such as a key faster. In addition, tools can be used to create the opening 602 and the plurality of holes 604 to meet the certain specifications and to ensure the smoothness of the edges of the opening 602 in the cooking body 606 and of the edges of the plurality of holes 604. The tools may include, for example, metal cutters to cut the opening 602, drills to create the plurality of holes 604, and sand papers to smooth the resulting edges. Furthermore, the tools used in creating the opening 602 and the plurality of holes 604 can minimize or eliminate the introduction of unneeded dents in the cooking body 606.

Similar to the barbecue grills 100 and 400 of FIGS. 1-5, the support structure 608 of the barbecue grill 600 may be further configured to enable movement/transport of the barbecue grill 600 via wheels 610, or similar mechanism, such as continuous tracks or treads. In some embodiments, the support structure 608 may be affixed to the cooking body 606 by means of welding or fasteners. The support structure 608 may have various legs that both support and control the mobility of the barbecue grill 600. Some or all of the legs may include the wheels 610 to allow the barbecue grill 600 to be easily moved from one location to another. Other legs could also provide a breaking or friction mechanism that resists any movement of the barbecue grill 600 from a certain location. The wheels 610 may be part of respective casters that rotate/swivel, allowing for even greater mobility of the barbecue grill 600.

In some embodiments, the barbecue grill 600 may also include a shelf 612, which may serve a dual function as a handle. The shelf 612, when used as a handle, can be used to carry and/or move the barbecue grill 600 from one location to another. The shelf 612 may be welded to the cooking body 606 or may be installed using fasteners, such as nuts and bolts, rivets, sheet metal screws, and the like. The shelf 612 may be made of various materials, such as metal, plastic, wood, and the like, or any combination thereof. The shelf 612 may further be used to prepare food or set utensils or other items upon while they are not in use.

Figure 7:
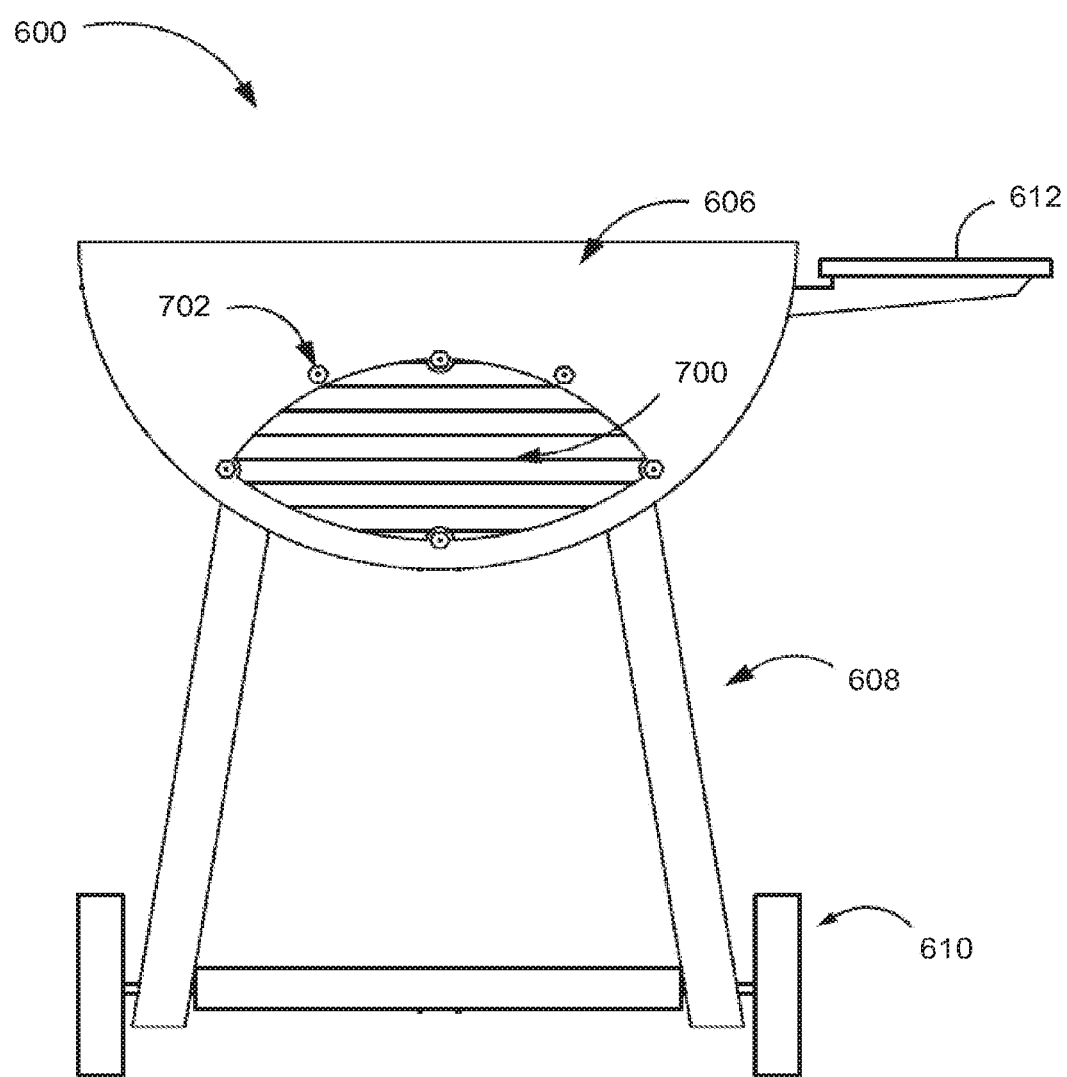
FIG. 7 illustrates a front view of an exemplary barbecue grill with an exemplary attachment in the form of a cover plate, according to embodiments disclosed herein.
Figure 10:
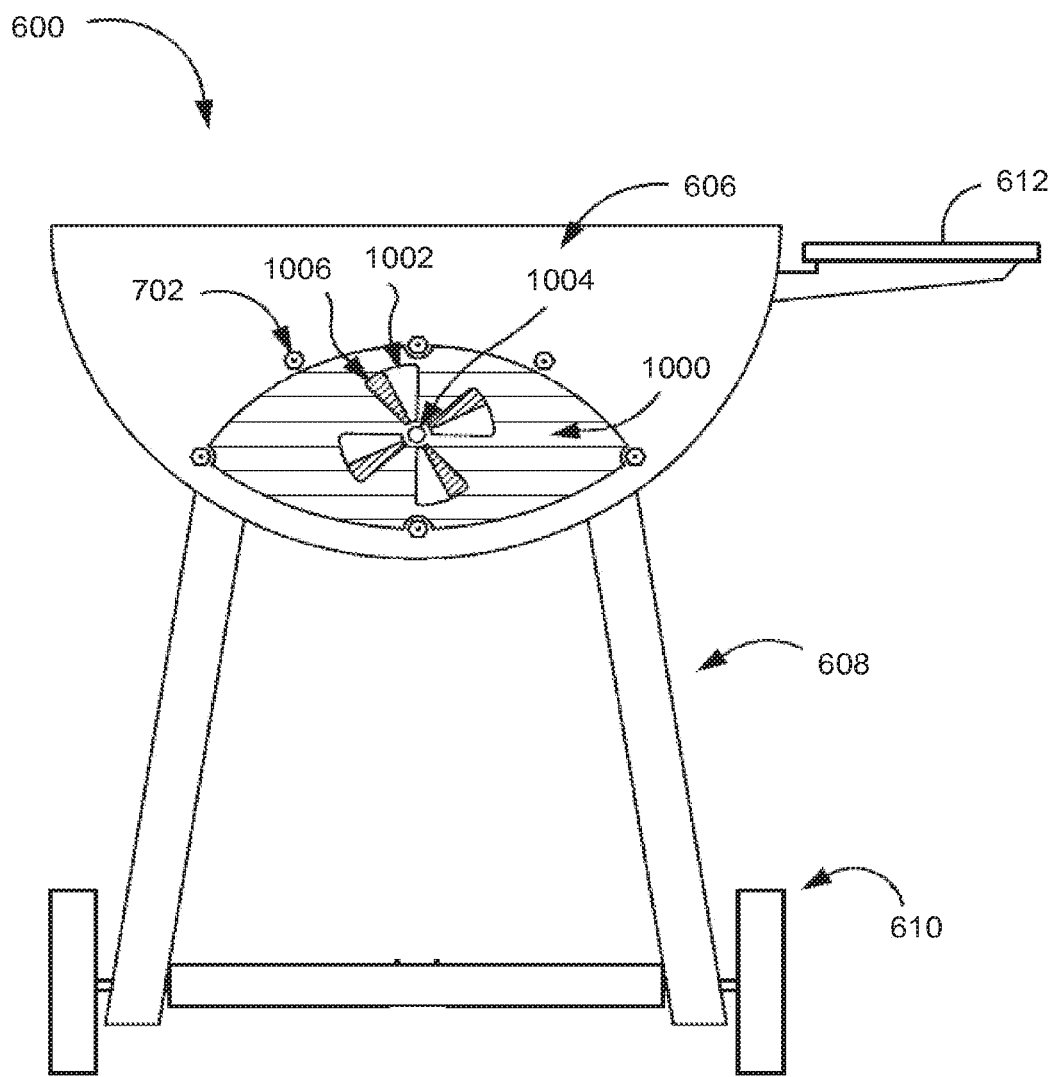
FIG. 10 illustrates a front view of an exemplary barbecue grill with an exemplary attachment in the form of an air vent plate, according to embodiments disclosed herein.
Figure 11:
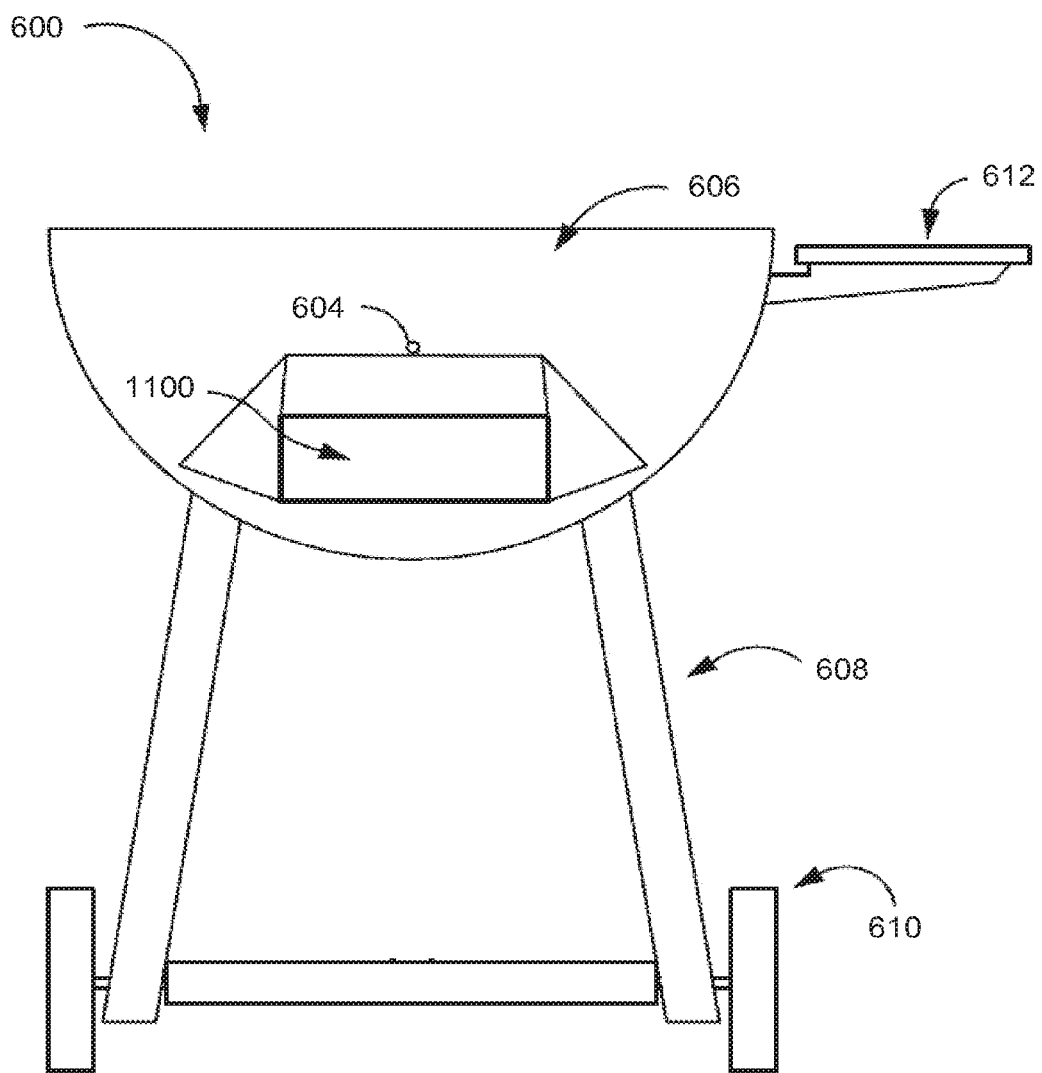
FIG. 11 illustrates a front view of an exemplary barbecue grill with an exemplary attachment in the form of a smoke box, according to embodiments disclosed herein.

FIGS. 7, 10 and 11 illustrate views of the barbecue grill 600 with various attachments. The attachments may be installed during or after manufacturing the barbecue grill 600. An attachment may substantially or completely cover the opening 602 and may be installed therein. In addition, the attachment may be securely attached or otherwise coupled to the cooking body 606 using fasteners configured to be received through a number of the plurality of holes 604 in the cooking body 606 and a plurality of holes in the attachment.

FIG. 7 illustrates an exemplary attachment 700 comprising a cover plate. The attachment 700 may be made out of a same or a different material as the cooking body 606 of the barbecue grill 600. The material of the attachment 700 can withstand high temperatures and may be, for example, metal or ceramic. The attachment 700 may have a shape and size to substantially cover the opening 602. For example, when the opening 602 is substantially elliptical, the attachment 700 may also be a substantially elliptical cover plate with a size larger than the opening 602. In addition, the attachment 700 may be installed on an outside surface or an inside surface of the cooking body 606. For example, when installed on the inside surface of the cooking body 606, the attachment 700 may have a first plane and a second plane, which are described in detail below with reference to FIGS. 12A-12C and 13. The second plane may be protruding relatively to the first plane. The first plane may be configured to contact the inside surface of the cooking body 606. The second plane may be configured to be located in the opening 602 and may be substantially flush with the outside surface of the cooking body 606 upon installation.

In some embodiments, the attachment 700 may include a plurality of holes 702. The plurality of holes 702 may comprise fastener holes. A number of the plurality of holes 702 may be the same as or different from the number of the plurality of holes 604 in the cooking body 606. To securely attach the attachment 700 to the barbecue grill 600, a number of fasteners may be used which are configured to be received by both the plurality of holes 702 of the attachment 700 and the plurality of holes 604 in the cooking body 606. A number of fasteners may be the same as or different from the number of the plurality of holes 702. In order to enable the secure attachment, a number of the plurality of holes 702 of the attachment 700 may be configured to match a corresponding number of the plurality of holes 604 in the cooking body 606. The matching may further comprise the plurality of holes 702 and the plurality of holes 604 having the same size, shape, and relative locations to allow the insertion of the fasteners. For example, where the attachment 700 is installed on the inside surface of the cooking body 606 and comprises the first plane and the second plane as previously described, the plurality of holes 702 may be located on the first plane of the attachment 700. Each hole of the plurality of holes 702 may match a hole of the plurality of holes 604 in the cooking body 606. A number of fasteners may be received through the plurality of holes 702 and the plurality of holes 604. The fasteners may further comprise nuts and bolts, among other types of fasteners. Bolts may be received through the plurality of holes 604 in the cooking body 606 and into the plurality of holes 702 in the attachment 700. Nuts may be attached to the bolts and may be torqued to contact the first plane of the attachment 700 and to securely attach the attachment 700 to the barbecue grill 600.

In some embodiments, the cooking body 606, instead of comprising a plurality of holes 604, may comprise a plurality of protrusions that resemble aspects of the previously described fasteners, or at least a male part of a two-part fastener with both male and female parts (e.g., nuts and bolts). In this scenario, the plurality of holes 702 in the attachment 700 may fit over, or otherwise receive, the plurality of protrusions in the cooking body 606 that are in proximity to the opening 602. Alternatively, the attachment 700, instead of comprising a plurality of holes 702, may comprise a plurality of protrusions that are configured to be received within the plurality of holes 604 in the cooking body 606. Thus, in some embodiments, either of the attachment 700 or the cooking body 606 may comprise a plurality of holes while the other component comprises a plurality of protrusions to be received within the plurality of holes. The plurality of protrusions may snap fit within the plurality of holes for a secure arrangement, or alternatively, female fasteners, such as nuts, may be placed on the plurality of protrusions, which in some cases may resemble threaded bolts for screwing nuts thereon.

Figure 8B:
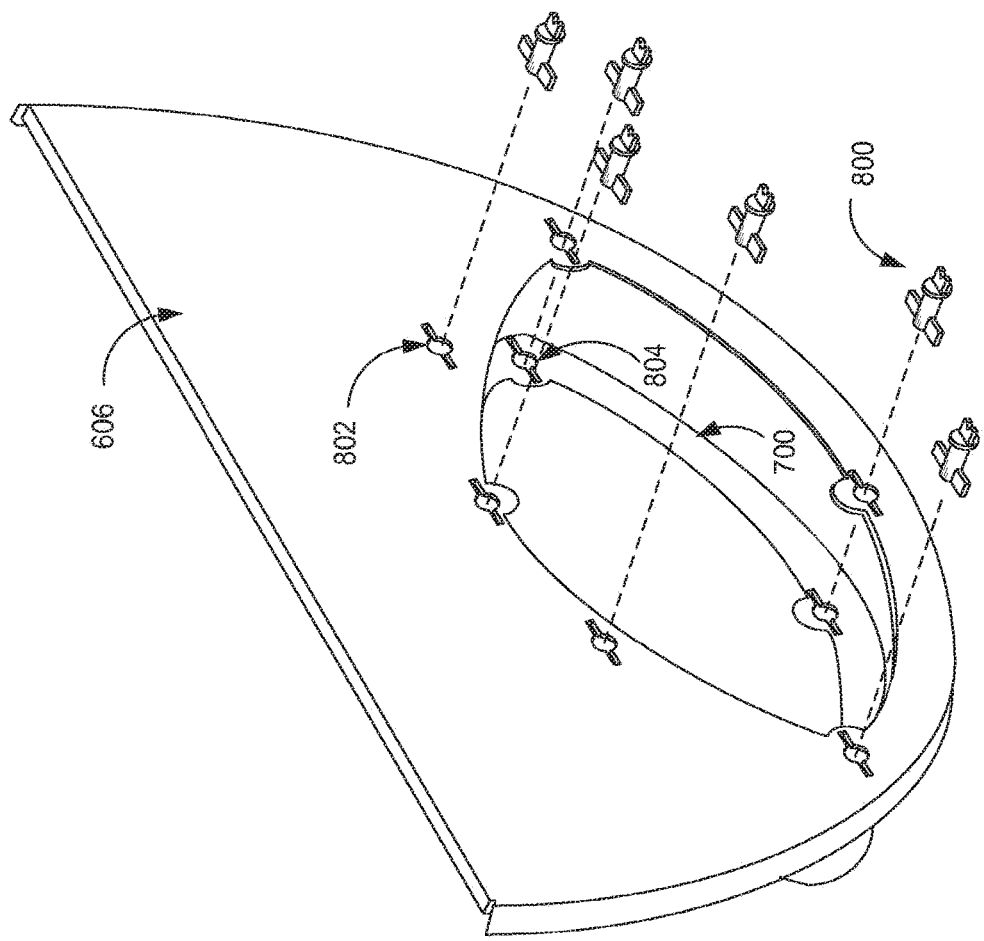
FIG. 8B illustrates an isometric view of an exemplary installation of an attachment in a barbecue grill using multiple of the key fasteners of FIG. 8A according to embodiments disclosed herein.
Figure 8A:
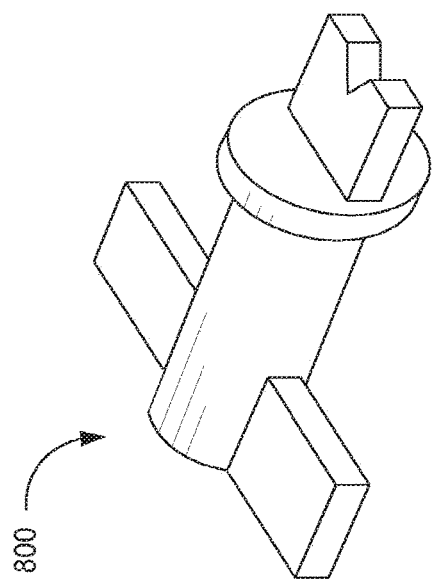
FIG. 8A illustrates an isometric view of a key fastener according to embodiments disclosed herein.
Figure 8C:
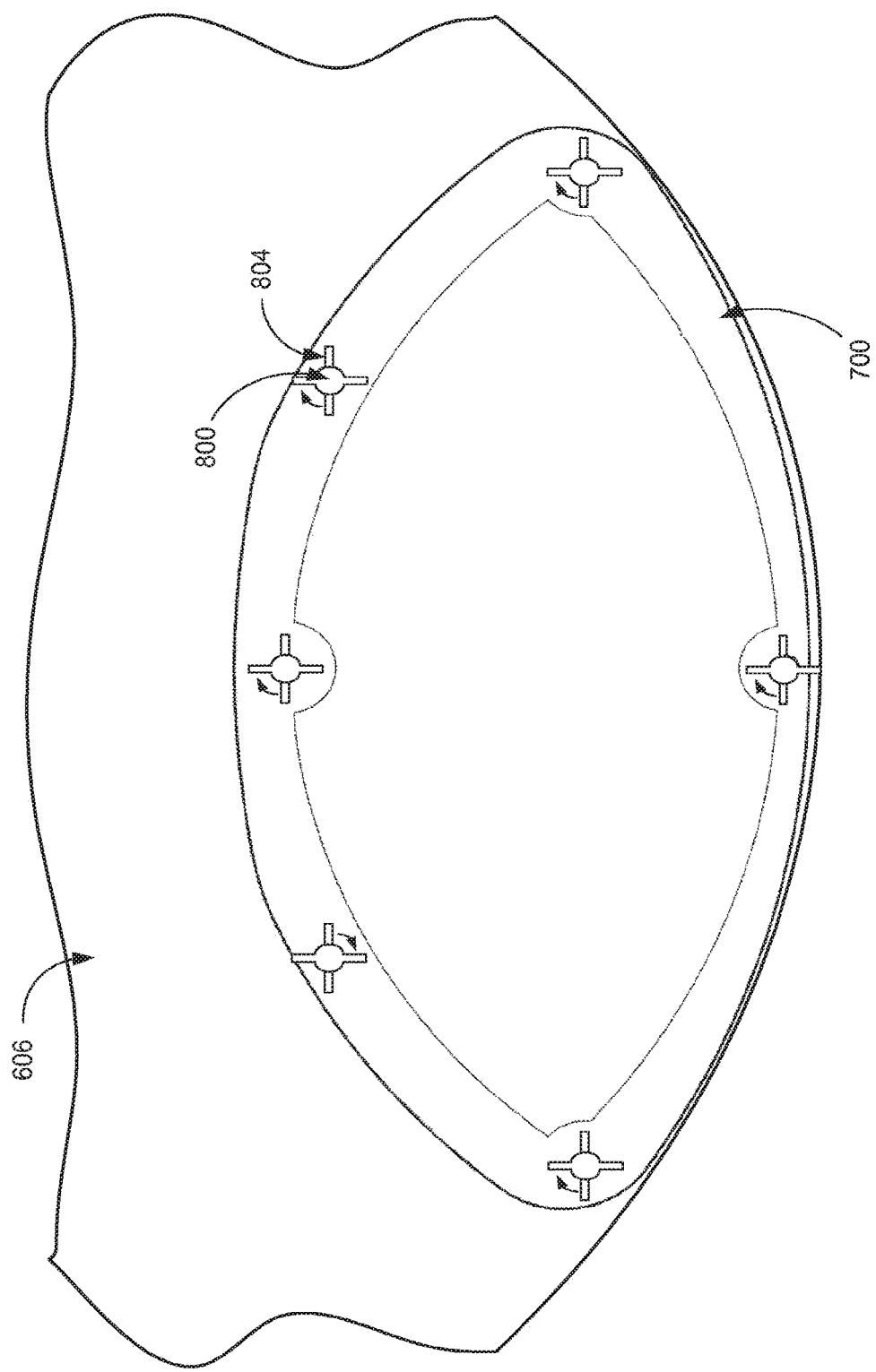
FIG. 8C illustrates a back view of an exemplary installation of an attachment in a barbecue grill using multiple of the key fasteners of FIG. 8A according to embodiments disclosed herein.

FIGS. 8A-8C illustrate an exemplary key fastener 800 and a corresponding installation using the key fastener 800 according to embodiments disclosed herein. The key fastener 800 is configured to be received in one of a plurality of holes 802 in the cooking body 606. Only a portion of the cooking body 606, such as a side wall, is shown in FIG. 8B for illustrative purposes. The key fasteners 800 may be utilized during installation of the attachment 700 in the barbecue grill 600. The plurality of holes 802 in the cooking body 606 are correspondingly shaped to a profile shape of the key fastener 800 in order to receive the key fasteners 800 therein. Additionally, a plurality of holes 804 in the attachment 700 are of a similar, or the same, shape as the plurality of holes 802 in the cooking body 606. The key fastener 800 is an example of a single-part fastener which does not require a secondary fastener component/part in order to couple the attachment 700 to the cooking body 606. FIG. 8C shows that once the key fastener 800 is inserted through the plurality of holes 802 in the cooking body 606 and the plurality of holes 804 in the attachment 700, it may be turned/rotated such that the key fastener 800 "locks" and is prevented from being removed due to interference with the attachment 700 after being turned/rotated. This ensures that the attachment 700 is securely coupled to the cooking body 606 during installation. In order to decouple the attachment 700 from the cooking body 606 and remove the key fastener 800, the fastener may be turned/rotated such that the profile of the key fastener 800 lines up with one of the plurality of holes 802 and one of the plurality of holes 804 such that the fastener 800 may be removed.

FIGS. 9A-9C illustrate an exemplary threaded rivet fastener 900 and a corresponding installation using the threaded rivet fastener 900 according to embodiments disclosed herein. The threaded rivet fastener 900 is configured to be received in one of a plurality of holes 604 in the cooking body 606. Only a portion of the cooking body 606, such as a side wall, is shown in FIG. 9B for illustrative purposes. The threaded rivet fasteners 900 may be utilized during installation of the attachment 700 in the barbecue grill 600. The threaded rivet fasteners 900 are generally circular in shape to be received in the plurality of holes 604 in the cooking body 606 the plurality of holes 702 in the attachment 700. The threaded rivet fastener 900 is yet another example of a single-part fastener which does not require a secondary fastener component/part in order to couple the attachment 700 to the cooking body 606. FIGS. 9C and 9D show that once the threaded rivet fastener 900 is inserted through the plurality of holes 604 in the cooking body 606 and the plurality of holes 702 in the attachment 700, it may be tightened with the use of a tool, such as a mandrel, such that the threaded rivet fastener 900 expands in diameter to secure the attachment 700 to the cooking body 606. This ensures that the attachment 700 is securely coupled to the cooking body 606 during installation. The use of the threaded rivet fastener 900 is an example of a fastener that is generally non-removable. As shown in FIG. 9B, at least one of the plurality of holes 604 may be disposed a different distance from the opening than another of the holes.

FIG. 10 illustrates an exemplary attachment 1000 comprising an air vent plate. The attachment 1000 may comprise some or all components of the attachment 700 of FIG. 7. A difference, among many possible differences, between the attachment 1000 and the attachment 700 is that the attachment 1000 may be configured to include a number of openings 1002 or vents that allow air to pass from one side to another side of the attachment 1000. The attachment 1000 may also include one or more holes 1004 that allow additional attachments, such as plate 1006, to be installed on or in the attachment 1000. The one or more holes 1004 may comprise fastener holes. The additional attachments may be movable in order to partially, substantially, or completely cover the openings 1002 by allowing a user to modify the location of some or all components of the additional attachments (i.e., plate 1006) relatively to the attachment 1000. For example, by grasping a handle or tab provided on the plate 1006, a user is able to move the plate 1006 relative to the attachment 1000 by rotating the plate 1006 about an axis perpendicular to a plane of the attachment 1000, thereby opening/closing, partially or entirely, the openings 1002.

In some embodiments, the one or more holes 1004 in the attachment 1000 may comprise a fastener hole 1004 located in a center of the attachment 1000. The number of openings 1002 in the attachment 1000 may be located symmetrically around the center of the attachment 1000 and around the fastener hole 1004 in the center of the attachment 1000. Each of the openings 1002 in the attachment 1000 may have a substantially trapezoidal shape. The plate 1006 may include a fastener hole located in a center of the plate 1006 that substantially matches the fastener hole 1004. The plate 1006 may further include openings that substantially match the openings 1002 in the attachment 1000. A fastener comprising, for example, a nut and a bolt, may be used to attach the plate 1006 to the attachment 1000 by the bolt being received through the fastener hole at the center of the plate 1006 and the fastener hole 1004 in the center of the attachment 1000. A user can then rotate the plate 1006 around an axis of the fastener. As such, the user can modify the size of the overlap between the openings 1002 in the attachment 1000 and the openings of the plate 1006. Further details of the attachment 1000 are described below with reference to FIGS. 12A-12C and FIG. 13.

FIG. 11 illustrates an exemplary attachment 1100 comprising a smoke box. The attachment 1100 may comprise some or all components of attachment 404 of FIGS. 4 and 5 and some or all components of the attachment 700 of FIG. 7. A difference, among many possible differences, between the attachment 1100 and the attachment 700 is that the attachment 1100 may be configured to pass smoke into the cooking body 606 of the barbecue grill 600 via the opening 602. As such, the attachment 1100 may have an interface with an opening that substantially matches the opening 602. The attachment 1100 may be installed in the cooking body 606 using the interface of the attachment 1100 and the opening 602. The interface of the attachment 1100 may further include a plurality of holes, such as the plurality of holes 702 in the attachment 700 of FIG. 7. A number of fasteners configured to be received through the plurality of holes of the interface and the plurality of holes 604 in the cooking body 606 may securely install the attachment 1100 in the cooking body 606. As shown in FIG. 11, the number of fasteners need not be the same as the number of plurality of holes 604, by virtue of the exposed hole 604 that may not receive a fastener. Similarly, the number of fasteners need not be the same as the number of the plurality of holes in the interface of the attachment 1100.

In some embodiments, the attachment 1100 may comprise the interface as described above and a box. The interface may be made of a material, such as metal or ceramic, that can withstand high temperatures. The box may be configured to hold material that can generate smoke. For example, the box may comprise a rectangular metallic box with a volume to hold wood chips. The wood chips may be a source of smoke when burnt inside the box. Smoke can then travel from inside the box through the opening 602 and into the cooking body 606 of the barbecue grill 600.

In some embodiments, a manufacturer may manufacture a barbecue grill 600 with an opening, such as the opening 602 of FIG. 6, in a cooking body, such as the cooking body 606 of FIG. 6. The manufacturer may install a cover plate, such as the attachment 700 of FIG. 7, at the opening 602 and may secure the attachment 700 to the cooking body 606 by using fasteners received through a plurality of holes in the attachment 700, such as plurality of holes 702 of FIG. 7, and a plurality of holes in the cooking body 606, such as the plurality of holes 604 of FIG. 6. A user may, for example, replace the attachment 700 with another attachment, such as the smoke box attachment 1100 of FIG. 11. The user can use their hand/fingers, or a tool, such as a wrench, to unfasten the fasteners, and can remove the attachment 700 from the cooking body 606, which may free the opening 602 where the attachment 700 was previously installed. The user can install the smoke box attachment 1100 in the opening 602 and can use their hand/fingers, or a tool, such as a wrench, to install or tighten fasteners within a plurality of holes in the smoke box attachment 1100 and the plurality of holes 604 in the cooking body 606 to securely attach the smoke box attachment 1100 to the cooking body 606. No new openings or holes need to be created in the barbecue grill 600 in order to install the smoke box attachment 1100 in this illustrative example.

Figure 12A:
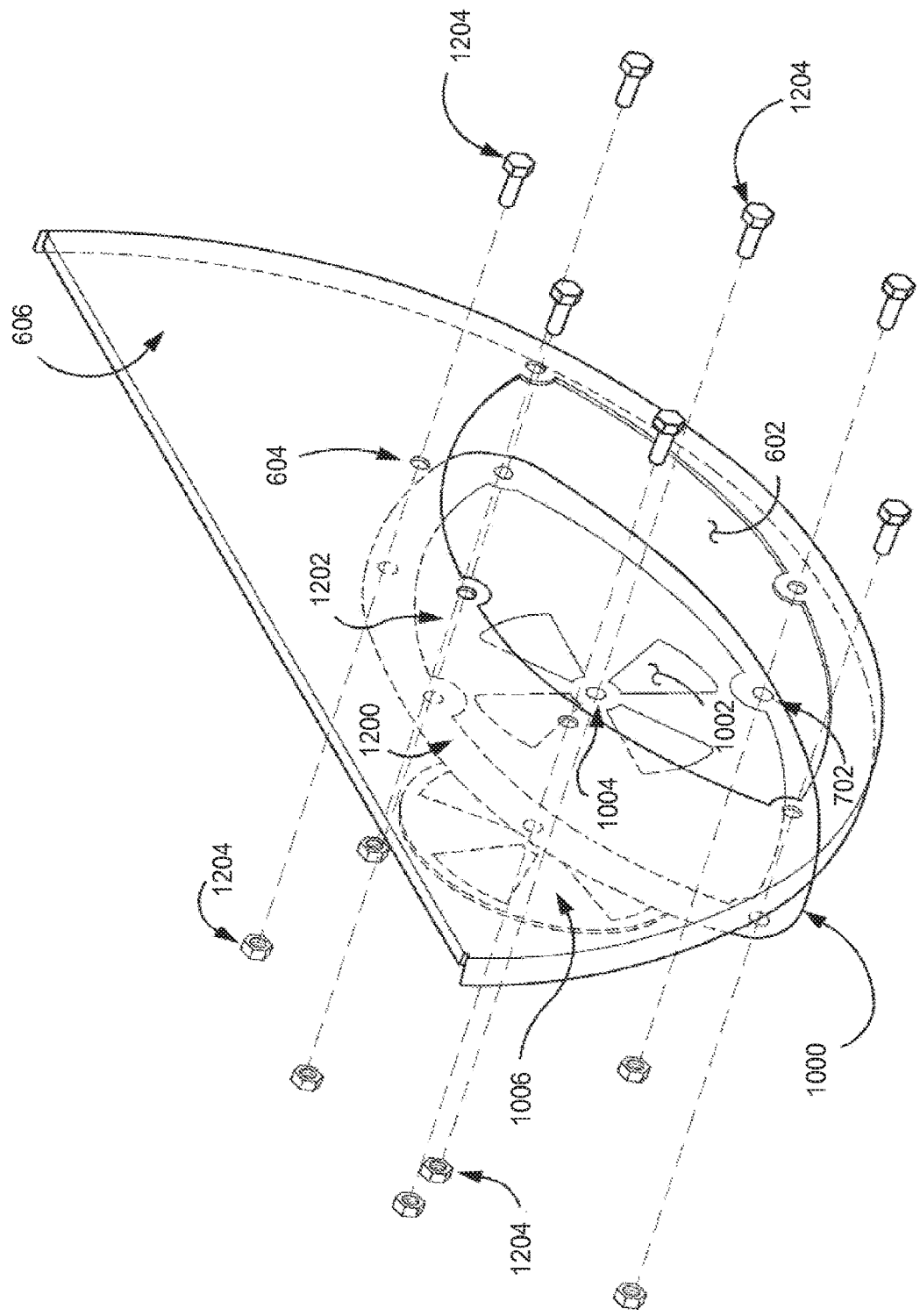
FIG. 12A illustrates an isometric and multi-layered view of an exemplary installation of an attachment in a barbecue grill according to embodiments disclosed herein.
Figure 13:
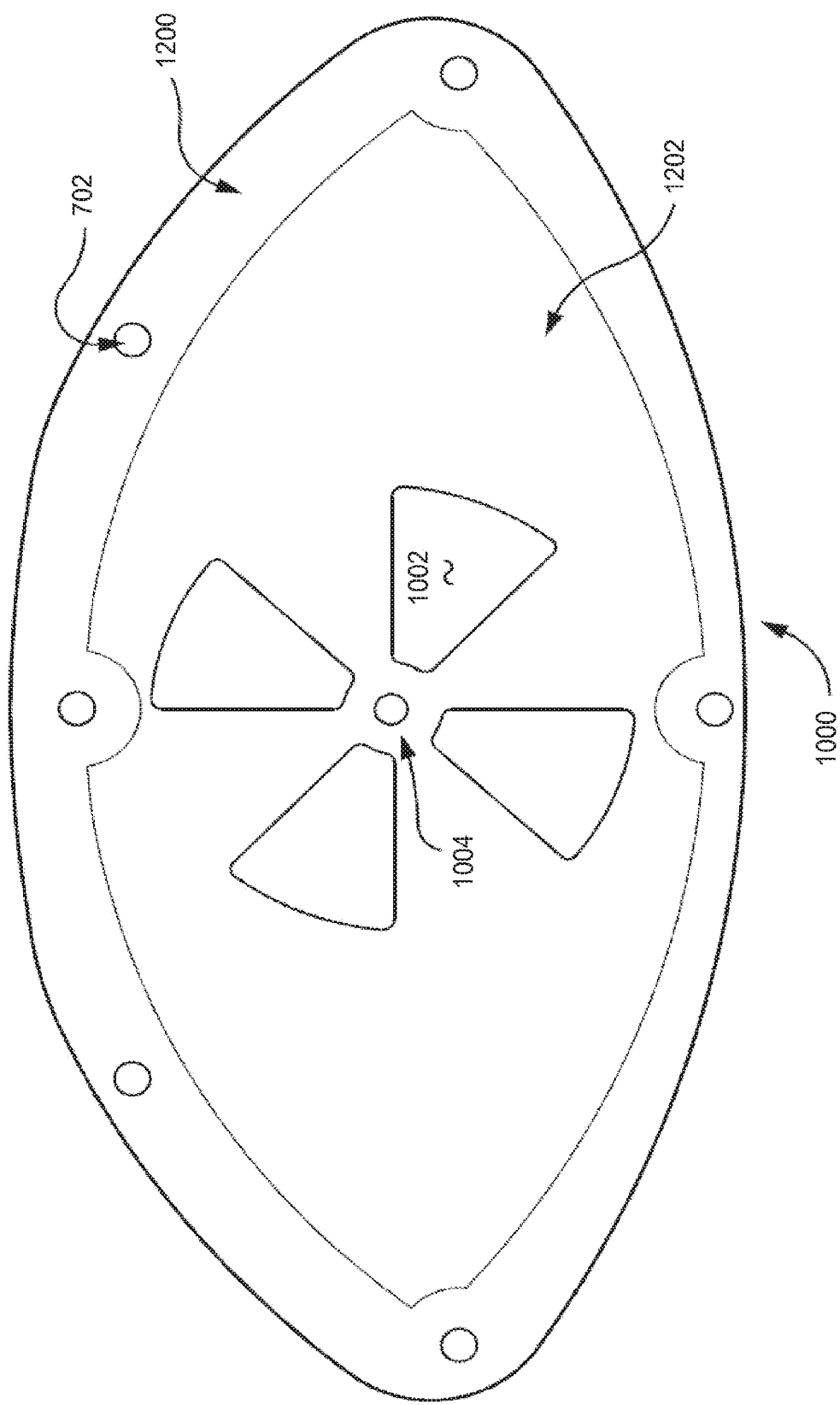
FIG. 13 illustrates an exemplary attachment for a barbecue grill according to embodiments disclosed herein.

FIGS. 12A-12C and FIG. 13 illustrate an exemplary installation of an attachment in a barbecue grill. Only a portion of the cooking body 606, such as a side wall, is shown in FIGS. 12A-12C for illustrative purposes. The barbecue grill may comprise some or all components of the barbecue grill 600 of FIG. 6. The attachment 1000 of FIG. 10 is shown for illustrative purposes in FIGS. 12A-12C and FIG. 13, but it is to be appreciated that any of attachments 700 or 1100 of FIGS. 7 and 11, or another suitable attachment may be used in place of the attachment 800. FIGS. 12A-12C illustrate an isometric front view, an isometric rear view, and a side view of the various installation components, respectively. FIG. 13 illustrates s a front view of the attachment 1000 in isolation.

The attachment 1000 may share a similar shape and size with the opening 602 in the cooking body 606 of the barbecue grill 600 and may substantially or completely cover the opening 602. As shown in FIGS. 12A-12C and FIG. 13, the overall shape of the attachment 1000 may be substantially elliptical when the opening 602 is substantially elliptical. In addition, as previously described, the attachment 1000 may have a first plane 1200 and a second plane 1202. The first plane 1200 may include the plurality of holes 702 in the attachment 1000. The plurality of holes 702 may substantially match the locations, sizes, and shapes of the plurality of holes 604 in the cooking body 606. FIGS. 12A and 12B illustrate a same number of the plurality of holes 702 in the attachment 1000 and the plurality of holes 604 in the cooking body 606, although the number may be different without changing the basic characteristics of the system. The attachment 1000 may be securely attached to the cooking body 606 using a plurality of fasteners 1204 configured to be received through the plurality of holes 702 of the attachment 1000 and the plurality of holes 604 in the cooking body 606. The fasteners 1204 may comprise nuts and bolts, rivets, butterfly fasteners, lugs, nails, pins, screws, key fasteners, locks, or the like. FIGS. 12A-12C show the fasteners 1204 as two-part fasteners that comprise nuts and bolts as an example. As described above with reference to FIGS. 8A and 8B, single-part fasteners, such as the fastener 800 shown in FIG. 8A, may be used in some embodiments. FIGS. 12A-12C further illustrate a same number of the fasteners 1204 and the plurality of holes 702 of the attachment 1000 (or the plurality of holes 604 in the cooking body 606), although the number can be different. The second plane 1202 may have a contour that substantially follows the contour of the opening 602. As such, the opening 602 and the second plane 1202 may have substantially the same shape and size. As previously described, when the attachment 1000 is installed on the inside surface of the cooking body 606, the second plane 1202 may be located within the opening 602 and may be configured to be substantially flush with the outside surface of the cooking body 606. The second plane 1202 may further comprise a number of openings 1002 or vents. For example, the openings 1002 may be substantially trapezoidal in shape and may also be symmetrically located around the center of the second plane 1202. The second plane 1202 may further comprise one or more holes 1004 to allow additional attachments, such as the plate 1006, to be installed on or in the attachment 1000. For example, FIGS. 12A and 12B and FIG. 13 depict a fastener hole 1004 located in the center of the second plane 1202.

The plate 1006 of FIGS. 12A-12C is an exemplary attachment that may be installed on or in the attachment 1000. The plate 1006 may have, for example, an overall circular shape, and may comprise a fastener hole 1206, a plurality of openings 1208, and a handle 1210 or tab. The fastener hole 1206 may be located in the center of the plate 1006 and may substantially match the size and shape of the fastener hole 804 of the attachment 1000. The plate 1006 may be installed on or in the attachment 1000 using a fastener 1204 received through the fastener hole 1004 of the attachment 1000 and the fastener hole 1206 of the plate 1006. The fastener 1204 may comprise any of the previously described fasteners, such as a nut and a bolt. The fastener 1204 may be tightened or otherwise fastened to an extent that allows movement of the plate 1006 relative to the attachment 1000. The openings 1208 may be located symmetrically around the center of the plate 1006 and may substantially match the size and shape of the openings 1002 of the attachment 1000. The handle 1210 or tab may be an extension/extrusion of the plate 1006, may be located on a contour or edge of one of the openings 1208, and may be received through one of the openings 1002 of the attachment 1000 and the opening 602 in the cooking body 606. As such, a user can rotate the plate 1006 around an axis of the fastener hole 1206 using the handle 1210 or tab, thereby varying the overlap between the openings 1002 of the attachment 1000 and the openings 1208 of the plate 1006.

The embodiments disclosed herein provide a method of manufacturing a barbecue grill, such as the barbecue grill 600, through forming a cooking body therein, such as the cooking body 606, by standard manufacturing methods of metal fabrication, such as molding, stamping, and punching of sheet steel, with the cooking body 606 configured to hold a cooking surface, such a grill, or full or partial cooking plate, and such that the cooking body 606 includes an opening, such as the opening 602, and a first plurality of fastener holes, such as the plurality of fastener holes 604. The manufacturer may form an attachment, such as the attachment 700, configured to substantially cover the opening 602 in the cooking body 606, wherein the attachment 700 includes a second plurality of fastener holes, such as the fastener holes 702. The manufacturer may fasten the attachment 700 to the cooking body 606 such that the attachment 700 substantially covers the opening 602 by installing a plurality of fasteners 1204, such as nuts and bolts, in the first plurality of holes in the cooking body 606 and in the second plurality of holes in the attachment 700.

In some embodiments, as shown in FIGS. 6-8C, 9B, 10, 12A, and 12B, the plurality of fastener holes includes a central lower fastener hole, a central upper fastener hole, and at least one of a left fastener hole or a right fastener hole. In some embodiments, the at least one of the left fastener hole or the right fastener hole is disposed a first distance above the central lower fastener hole and a second distance below the central upper fastener hole, with the first distance being different than the second distance. In some embodiments, the first distance is less than the second distance. In some embodiments, the first plurality of fastener holes includes a first number of fastener holes above the at least one of the left fastener hole or the right fastener hole and a second number of fastener holes below the at least one of the left fastener hole or the right fastener hole, with the first number being different than the second number. In some embodiments, the first number is greater than the second number. In some embodiments, the first plurality of fastener holes further includes an upper left fastener hole and an upper right fastener hole, with the upper left fastener hole being disposed closer to the central upper fastener hole than the left fastener hole and the upper right fastener hole being disposed closer to the central upper fastener hole than the right fastener hole. In some embodiments, the cooking body defines a fastener-head support that extends into the prefabricated opening, and the fastener-head support at least partially defines one of the plurality of fastener holes, as shown in the drawings with respect to the central upper fastener hole, the central lower fastener hole, the left fastener hole, and the right fastener hole, with the support supporting the head of the fastener when coupled to the cooking body, as shown for example in FIGS. 10, 12A, and 12B. In some embodiments, a perimeter of the opening and the first fastener-head support cooperatively define a corner. In some embodiments, at least one fastener hole in the first plurality of fastener holes lacks a fastener-head support that extends into the prefabricated opening. In some embodiments, the first plurality of fastener holes defines a hole pattern that is asymmetric about a horizontal axis that is central to the opening and that extends across the opening.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:
1. A barbecue grill assembly, comprising:
a cooking body configured to hold a cooking surface, the cooking body including a prefabricated opening and a first plurality of fastener holes in proximity to the prefabricated opening, the prefabricated opening configured to have a cooking attachment releasably fastened thereat;
a cover plate configured to substantially cover the prefabricated opening, the cover plate including a second plurality of fastener holes;
a plurality of fasteners configured to couple the cover plate to the cooking body, each of the plurality of fasteners configured to be received in one of the first plurality of fastener holes and in one of the second plurality of fastener holes; and the cover plate releasably attached to the cooking body by the plurality of fasteners placed through the first plurality of fastener holes and second plurality of fastener holes, wherein the cover plate includes a vent opening and is configured to support a vent-cover attachment that is configured to selectively cover the vent opening, wherein the first plurality of fastener holes are configured to facilitate coupling a smoker to the cooking body, wherein the opening is configured to fluidly couple with the smoker while the smoker is coupled to the cooking body, wherein the first plurality of fastener holes includes a central lower fastener hole, a central upper fastener hole, and at least one of a left fastener hole or a right fastener hole, the at least one of the left fastener hole or the right fastener hole being disposed a first distance above the central lower fastener hole and a second distance below the central upper fastener hole, the first distance being different than the second distance.

2. The barbecue grill assembly of claim 1, further comprising the cooking surface, wherein the cooking surface is located above the opening.

3. The barbecue grill assembly of claim 1, wherein the cover plate includes a surface size larger than a size of the opening.

4. the barbecue grill assembly of claim 3, wherein the cover plate includes a plurality of vent openings.

5. The barbecue grill assembly of claim 4, wherein the cover plate includes at least one other fastener hole in addition to the second plurality of fastener holes, the at least one other fastener hole configured to facilitate coupling the vent-cover attachment to the cover plate.

6. The barbecue grill assembly of claim 3, wherein the cover plate is configured to be coupled to the cooking body while the cover plate is disposed on an inside surface of the cooking body.

7. The barbecue grill assembly of claim 1, wherein the cover plate includes a shape that is substantially similar to an edge shape of the opening.

8. A method of manufacturing a barbecue grill, comprising:

forming a cooking body configured to releasably hold a cover plate in a prefabricated opening therein, the prefabricated opening configured to have a cooking attachment releasably fastened thereat;

forming a first plurality of fastener holes defined by the cooking body adjacent to the prefabricated opening, the cooking body defining a fastener-head support that extends into the prefabricated opening, the fastener-head support at least partially defining a first fastener hole in the first plurality of fastener holes;

forming the cover plate, the cover plate being configured to substantially cover the prefabricated opening in the cooking body, the cover plate including a second plurality of fastener holes and being further configured to attach to the cooking body with a plurality of fasteners to be received in the first plurality of fasteners holes and in the second plurality of fastener holes; and attaching the cover plate to the prefabricated opening with a plurality of fasteners placed through the first plurality of fastener holes and second plurality of fastener holes, wherein the cover plate includes a vent opening and is configured to support a vent-cover attachment that is configured to selectively cover the vent opening, wherein the first plurality of fastener holes are configured to facilitate coupling a smoker to the cooking body, wherein the opening is configured to fluidly couple with the smoker while the smoker is coupled to the cooking body, wherein the prefabricated opening defines a first central axis that extends through the prefabricated opening, and the first fastener hole defines a second central axis that extends through the first fastener hole, whereby the fastener-head support that extends into the prefabricated opening facilitates increasing a size of the prefabricated opening relative to a distance between the first central axis and the second central axis.

9. The method of claim 8, wherein the cover plate comprises a first plane and a second plane, wherein the first plane is configured to contact an inside surface of the cooking body, and wherein the second plane is configured to be located in the opening and substantially flush with an outside surface of the cooking body.

10. The method of claim 8, wherein the opening defines at least one corner defined by a perimeter of the opening and the fastener-head support.

11. A method of using a barbecue grill assembly, comprising:

providing the barbecue grill assembly, the assembly comprising:

a cooking body configured to hold a cooking surface, the cooking body including a prefabricated opening and a first plurality of fastener holes in proximity to the prefabricated opening, the prefabricated opening configured to have a cooking attachment releasably fastened thereat, the first plurality of fastener holes includes a lower fastener hole, an upper fastener hole, and at least one of a left fastener hole or a right fastener hole, the at least one of the left fastener hole or the right fastener hole being disposed a first distance above the lower fastener hole and a second distance below the upper fastener hole, the first distance being different than the second distance;

a cover plate configured to substantially cover the prefabricated opening, the cover plate including a second plurality of fastener holes;

a plurality of fasteners configured to couple the cover plate to the cooking body, each of the plurality of fasteners configured to be received in one of the first plurality of fastener holes and in one of the second plurality of fastener holes; and the cover plate releasably attached to the cooking body by the plurality of fasteners placed through the first plurality of fastener holes and the second plurality of fastener holes, wherein the cover plate includes a vent opening and is configured to support a vent cover attachment that is configured to selectively cover the vent opening; and unfastening the plurality of fasteners while the cover plate is attached to the cooking body;

separating the cover plate from the cooking body;

positioning a smoker to be in fluid communication with the cooking body through the opening;

fastening the smoker to the cooking body with fastener holes in the smoker aligned with the first plurality of fastener holes; and cooking food in the cooking body while smoke generated in the smoker flows into the cooking body through the opening.

12. The barbecue grill assembly of claim 1, wherein the first plurality of fastener holes includes a first number of fastener holes above the at least one of the left fastener hole or the right fastener hole and a second number of fastener holes below the at least one of the left fastener hole or the right fastener hole, the first number being different than the second number.

13. The barbecue grill assembly of claim 1, wherein the first plurality of fastener holes further includes an upper left fastener hole and an upper right fastener hole, the upper left fastener hole being disposed closer to the central upper fastener hole than the left fastener hole, the upper right fastener hole being disposed closer to the central upper fastener hole than the right fastener hole.

14. The barbecue grill assembly of claim 1, wherein a first one of the fastener holes in the first plurality of fastener holes is at least partially defined by a first fastener-head support that extends into the prefabricated opening.

15. The barbecue grill assembly of claim 14, wherein a second one of the fastener holes in the first plurality of fastener holes lacks a fastener-head support that extends into the prefabricated opening.

16. The barbecue grill assembly of claim 14, wherein a perimeter of the opening and the first fastener-head support cooperatively define a corner.

17. The method of claim 8, wherein the first plurality of fastener holes further includes a second fastener hole that lacks a fastener-head support that extends into the prefabricated opening.

18. The barbecue grill assembly of claim 1, wherein the first plurality of fastener holes defines a hole pattern that is asymmetric about a horizontal axis that is central to the opening and that extends across the opening.

19. The method of claim 18, wherein the first plurality of fastener holes includes at least one of a left fastener hole or a right fastener hole, the first plurality of fastener holes including a first number of fastener holes above the at least one of the left fastener hole or the right fastener hole, the first plurality of fastener holes defining a second number of fastener holes below the at least one of the left fastener hole or the right fastener hole, the first number being different than the second number.

20. The method of claim 19, wherein the first number is greater than the second number.

\* \* \* \* \*